(12) United States Patent
Bertino

(10) Patent No.: US 9,392,745 B2
(45) Date of Patent: Jul. 19, 2016

(54) AGRICULTURAL IMPLEMENT FOR REAPING AND WINDROWING

(71) Applicant: Indústrias Reunidas Colombo Ltda., Pindorama (BR)

(72) Inventor: Luiz Henrique Bertino, Pindorama (BR)

(73) Assignee: INDUSTRIAS REUNIDAS COLOMBO LTDA., Pindorama-SP (BR)

( * ) Notice: Subject to any disclaimer, the term of this patent is extended or adjusted under 35 U.S.C. 154(b) by 0 days.

(21) Appl. No.: 14/414,012

(22) PCT Filed: Feb. 15, 2013

(86) PCT No.: PCT/BR2013/000048
§ 371 (c)(1),
(2) Date: Jan. 9, 2015

(87) PCT Pub. No.: WO2014/056055
PCT Pub. Date: Apr. 17, 2014

(65) Prior Publication Data
US 2015/0156965 A1    Jun. 11, 2015

(30) Foreign Application Priority Data
Oct. 8, 2012    (BR) .......................... 1020120256150

(51) Int. Cl.
| A01D 43/00 | (2006.01) |
| A01D 57/00 | (2006.01) |
| A01D 43/02 | (2006.01) |
| A01D 43/06 | (2006.01) |
| A01D 34/40 | (2006.01) |
| A01D 34/06 | (2006.01) |
| A01D 45/22 | (2006.01) |

(Continued)

(52) U.S. Cl.
CPC ................ *A01D 43/06* (2013.01); *A01D 34/06* (2013.01); *A01D 34/40* (2013.01); *A01D 45/22* (2013.01); *A01D 57/01* (2013.01); *A01D 63/04* (2013.01); *A01D 67/00* (2013.01); *A01D 69/06* (2013.01)

(58) Field of Classification Search
USPC ..................................... 56/315, 314, 316, 192
See application file for complete search history.

(56) References Cited

U.S. PATENT DOCUMENTS

| 1,108,536 | A | * | 8/1914 | Wodtli | ................... | A01D 34/23 |
| | | | | | | 56/316 |
| 1,597,578 | A | * | 8/1926 | Burke | ................... | A01D 34/23 |
| | | | | | | 56/316 |

(Continued)

FOREIGN PATENT DOCUMENTS

| BR | PI 7706839 | 5/1979 |
| BR | PI 8007600 | 7/1982 |

(Continued)

OTHER PUBLICATIONS

International Search Report for PCT/BR2013/000048 dated Jun. 5, 2013.

*Primary Examiner* — Árpád Fábián-Kovács
(74) *Attorney, Agent, or Firm* — B. Aaron Schulman, Esq.; Stites & Harbison, PLLC

(57) ABSTRACT

An agricultural implement is provided having mechanical activation and hydraulic engines for different sets and for functioning attached to a conventional tractor having a power outlet and a hydraulic system, thus enabling for the harvesting and windrowing of different plants.

12 Claims, 37 Drawing Sheets

(51) Int. Cl.
*A01D 57/01* (2006.01)
*A01D 63/04* (2006.01)
*A01D 67/00* (2006.01)
*A01D 69/06* (2006.01)

(56) References Cited

U.S. PATENT DOCUMENTS

| | | | | |
|---|---|---|---|---|
| 1,677,668 | A | * | 7/1928 | Barber .................. A01D 34/23 56/316 |
| 2,097,921 | A | * | 11/1937 | Hite ....................... A01D 34/23 56/229 |
| 2,195,518 | A | * | 4/1940 | Johnson ................. A01D 34/23 56/316 |
| 2,284,517 | A | * | 5/1942 | Fink ....................... A01D 34/23 56/236 |
| 2,521,999 | A | * | 9/1950 | Scott ...................... A01D 43/10 241/101.763 |
| 2,530,733 | A | * | 11/1950 | Ronning .............. A01D 34/125 56/17.6 |
| 2,852,955 | A | * | 9/1958 | Chavis ................... A01D 34/23 56/316 |
| 4,341,061 | A | | 7/1982 | Denzin |
| 4,694,640 | A | * | 9/1987 | Ermacora ............. A01D 34/66 56/13.6 |
| 5,711,140 | A | * | 1/1998 | Burmann ............ A01D 41/148 56/14.4 |
| 5,867,972 | A | * | 2/1999 | Laumann ............... A01D 41/14 56/126 |
| 6,453,655 | B2 | * | 9/2002 | Ferraris ................. A01D 57/03 56/126 |
| 7,082,742 | B2 | * | 8/2006 | Schrattenecker .... A01D 41/148 56/208 |
| 2013/0263566 | A1 | * | 10/2013 | Lovett .................... A01D 34/23 56/158 |
| 2014/0250850 | A1 | * | 9/2014 | Boenig ................. A01D 45/021 56/94 |

FOREIGN PATENT DOCUMENTS

| | | |
|---|---|---|
| BR | PI 8200403 | 9/1983 |
| BR | PI 8204552 | 3/1984 |
| BR | MU 7101502 U | 10/1991 |
| BR | PI 9102501 A | 1/1993 |
| BR | PI 9102861 A | 2/1993 |
| BR | PI 9202621-4 A | 1/1994 |
| BR | PI 9205001-8 A | 6/1994 |
| BR | PI 9404196-2 A | 12/1996 |
| BR | MU 7801088-8 U | 2/2000 |
| BR | PI 9902566-3 A | 8/2000 |
| BR | MU 7900789-9 U | 9/2000 |
| BR | PI 0002298-5 A | 1/2001 |
| BR | PI 0001647-0 A | 6/2001 |
| BR | PI 0004195-5 A | 4/2002 |
| BR | MU 8201891-0 U | 11/2002 |
| BR | PI 0203312-7 A | 11/2002 |
| BR | MU 8301613-9 U | 3/2005 |
| BR | MU8600961 | 10/2006 |
| BR | PI0701818 | 3/2009 |
| BR | PI0904564 | 7/2011 |
| WO | WO 2013089224 A1 * | 6/2013 ............. A01D 34/30 |

* cited by examiner

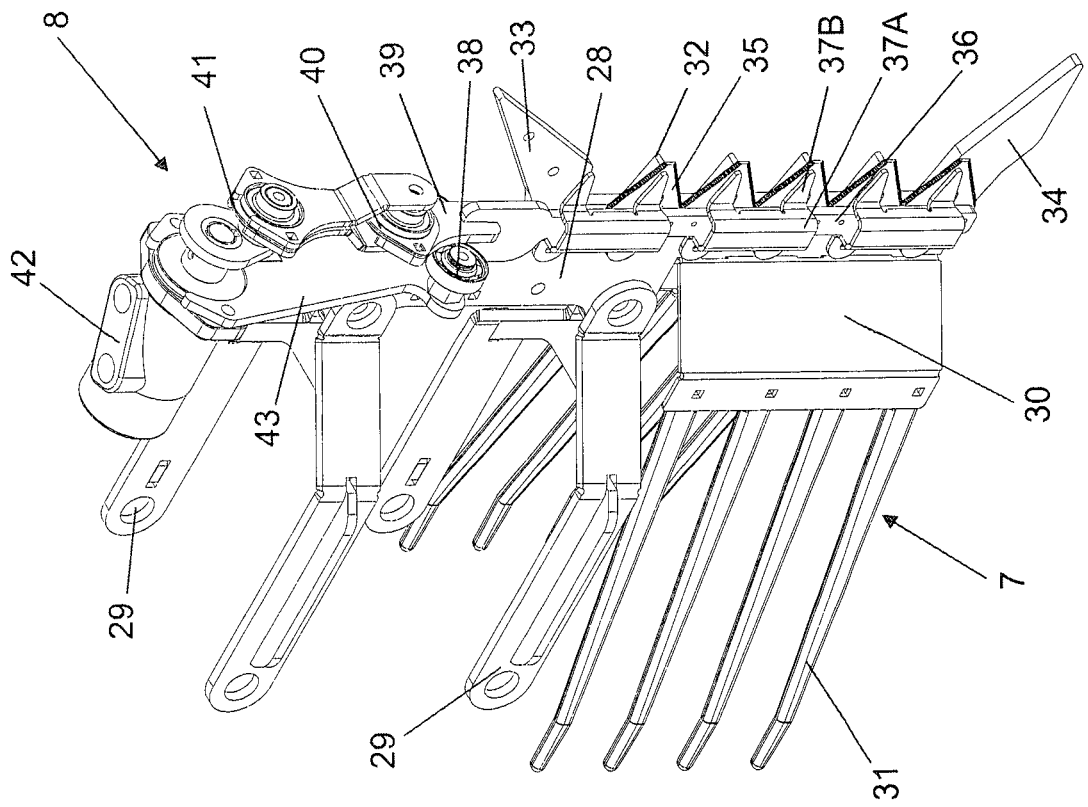
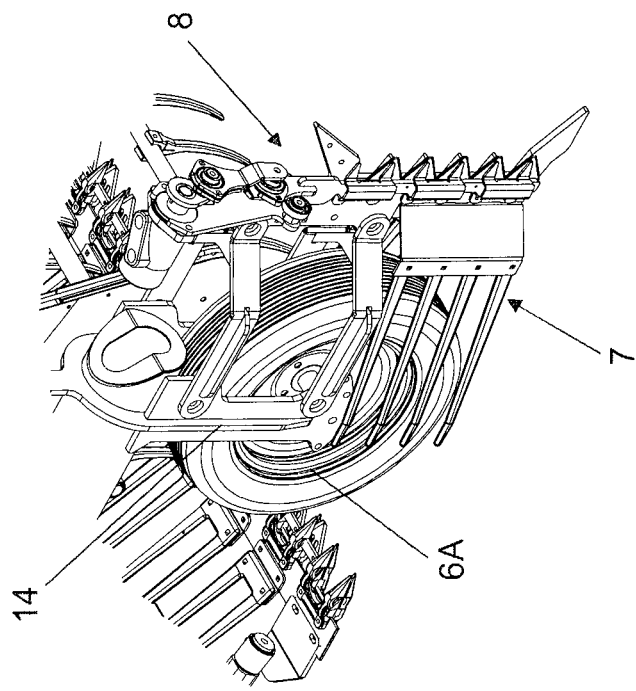
FIG. 10

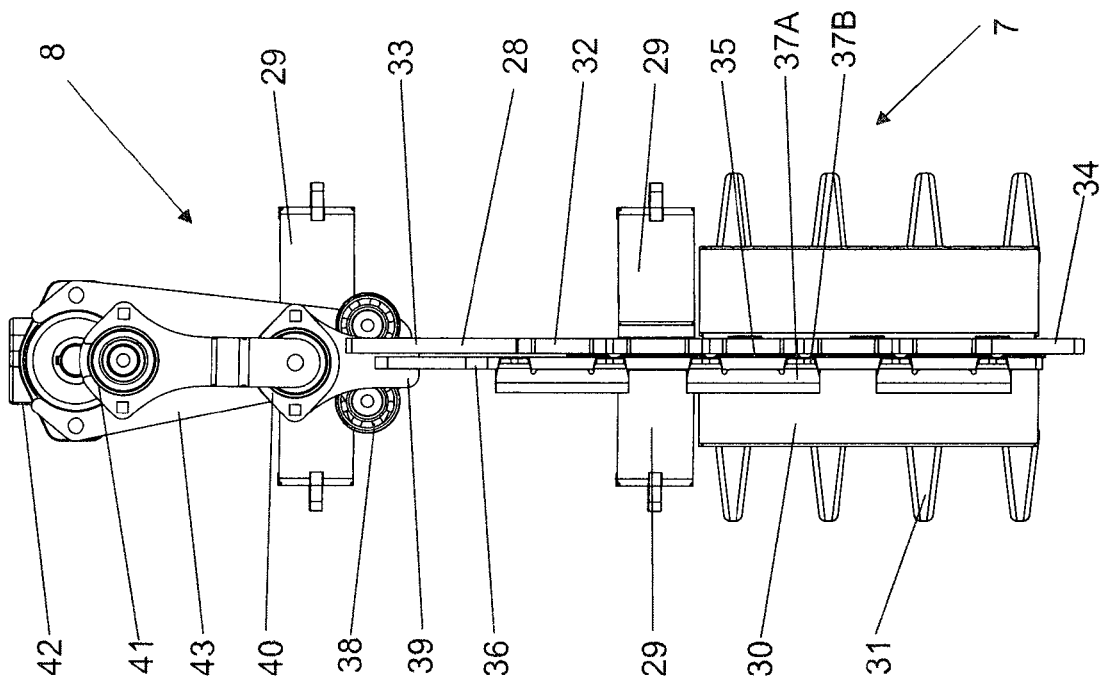
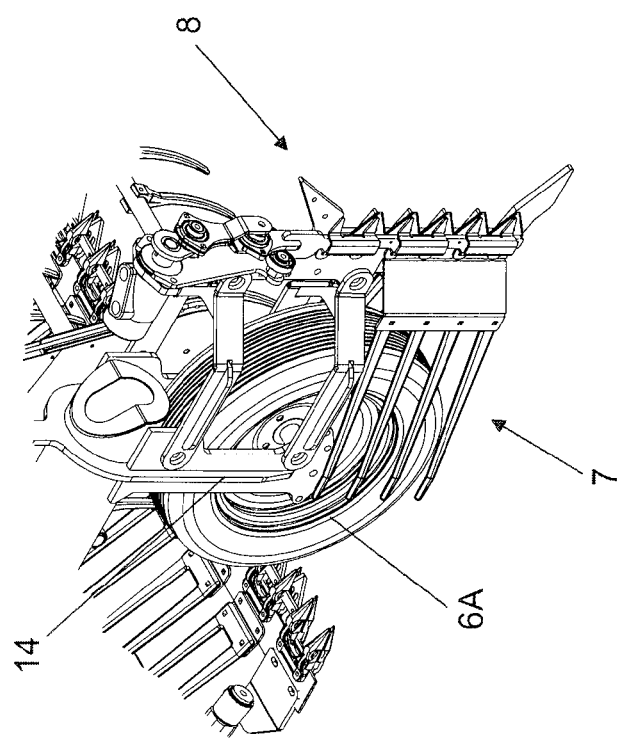
FIG. 11

AGRICULTURAL IMPLEMENT FOR REAPING AND WINDROWING

FIELD OF INVENTION

The present invention refers to an agricultural implement meant to function attached to a conventional tractor with an adequate power outlet and hydraulic system; more specifically an oil pump, as this implement has mechanical activation and hydraulic engines for different sets. The first of these is a lifting and collecting frontal set, positioned horizontally and made of many claw shaped collecting combs, which individually rotate and orbit around a special structure. This set has been developed to lift and move the plants to the inside of the machine. It is located besides scissor like vertical cutting bars which limit the width of the of the rows as the plants are cut at their base and launched back to the top of the last aligning set, a pair of transversal conveyor belts which are situated along the width of the machine. Between them is an empty space for unloading and windrowing to which both the conveyor belts are directed at, bringing the material collected so that it falls to the ground, creating the windrows. These sets and processes make up for an ideal implement for harvesting and windrowing different plants, manly those of bean, soy and plants alike.

STATE OF THE ART

There exist today different agricultural implements for executing the tasks mentioned above, especially harvesting and windrowing beanstalk, such as the ones presented in the Brazilian documents below:
EQUIPMENT FOR HARVESTING BEANSTALKS AND ALIKE
PI0701818—30 Jul. 2007
SYSTEM FOR CUTTING AND WINDROWING BEANSTALKS AND ALIKE
MU8600961—30 May 2006
ARRANGEMENT INTRODUCED IN AN AGRICULTURAL IMPLEMENT TO REAP AND COLLECT VARIOUS GRAIN CULTURES
MU8301613—14 Jul. 2003
ARRANGEMENT INTRODUCED IN A FIXED SIEVE FOR A BEAN AND PEANUT HARVESTER
MU8301332—28 Jul. 2003
ARRANGEMENT INTRODUCED IN NA AGRICULTURAL IMPLEMENT
TO REAP AND COLLECT BRANCHES OF VARIOUS CULTURES
MU8201891—13 Aug. 2002
ARRANGEMENT INTRODUCED IN COLLECTING MOUTH FOR A BEAN AND PEANUT HARVESTER
PI0203312—16 Aug. 2002
REAPER AND GATHERERER SET FOR BRANCHES OF VARIOUS CULTURES
PI0004195—1 Sep. 2000
BEAN GATHERING PLATFORM COUPLED TO AN UNIVERSAL HARVESTER.
PI0002298—5 May 2000
HARVESTING MACHINE
PI0001647—19 Apr. 2000
BRANCHES REAPER SET
PI9902566—25 Jun. 1999
REAPER AND GATHERERER SET FOR BRANCHES IN A GRAIN HARVESTER
MU7900789—21 May 1999
ARRANGEMENT INTRODUCED IN A BEANS AND PEANUT HARVESTER
MU7801088—8 Jun. 1998
ARRANGEMENT INTRODUCED IN A BEANS AND PEANUT HARVESTER
PI9404196—17 Oct. 1994
MOWER BEANS HARVESTER
PI9205001—8 Aug. 1992
REAPING MACHINE FOR COLLECTING GRAINS
PI9202621—7 Jul. 1992
BEANS HARVESTER
PI9102861—8 Jul. 1991
GRAIN REAPER, COLLECTOR AND WINDROWER
MU7101502—5 Jul. 1991
BEANS HARVESTER
PI9102501—18 Jun. 1991
AGRICULTURAL IMPLEMENT FOR COLLECTING PEANUTS AND BEANS
MU7100025—2 Jan. 1991
BEAN PULLER
PI8204552—2 Aug. 1982
IMPROVEMENT IN A MECHANIC AGRICULTURAL IMPLEMENT TO DISROOT AND WINDOROW BEANS
PI8200403—22 Jan. 1982
AGRICULTURAL IMPLEMENT TO DISROOT BEANS AND ALIKE
PI8007600—19 Nov. 1980
MECHANIC IMPLEMENT TO COLLECT BEANS COUPLED TO A BEAN HARVESTER
MU6000710—17 Jun. 1980
AGRICULTURAL IMPLEMENT FOR CUTTING AND DISROOTING BEANS
PI7706839—12 Oct. 1977
HARVESTER FOR BEANS AND OTHER USES After looking at these, we can see there are currently a considerable variety of implements to process cultivations of beans. Some are more complex, used for reaping and separating the grains, while others feature ways of harvesting and windrowing the plants so that they later may be gathered and processed for sorting and cleaning of the grains. As an example, PI0001647, shows an agricultural complement in the form of an independent cylinder head, formed solely by a structure capable of being easily attached to different types of tractors. These tractors can range from the simple most ones, to the more sophisticated, in a way that said cylinder head can be powered by the power outlet of such a tractor. Thereby, with just one simple equipment, the producer has available to him an implement for reaping and windrowing different types of plants, notably the beanstalk. Therefore, the objective of the present invention is a mechanical unit to optimize the entire process of harvesting different types of plants that produce grains such as: wheat, rice, sorghum, peas, beans and/or others. This mechanical unit not only features a low manufacturing cost, but also requires low maintenance and can be acquired by small and medium sized producers.

PI9902566 describes an agricultural complement in the form of an independent cylinder head, formed by two structures. The first of these features mechanical resources for assembling a gathering system and a reaping system. The reaping system cuts the plant at its base, while the other gathers it up and throws it backward in the direction of two conveyor belts. These belts are transversally aligned and work in opposite directions pulling the plant cluster from the collecting roller to the center of the set, and from this point back, starts the action of the third conveyor belt in a way that the plants can be tossed to the inside of the second structure.

Inside of this structure are two other conveyor belts and other sets of the harvester that processes the material collected, that is, sorts the plants from the dirt, dropping the grain completely clean. Therefore, the objective of this invention is a mechanical unit to optimize the entire process of harvesting different types of plants that produce grains such as: wheat, rice, sorghum, peas, beans and/or others.

In both cases mentioned, all the mechanical parts of the agricultural implement are powered by the power outlet of the tractor; this utilizes different belt and chain transmissions.

On the other hand, both implements were developed for small and medium sized producers, and consequently have some restrictions, manly in reference to its performance.

PI0203312 was developed to comprise a large sized reaper/harvester unit to be attached to an automotive machine, which in this case, is not a tractor, but a much more potent machine used to haul large sized agricultural equipment. In general, an automotive is a unit of force considerably big, containing a potent engine that usually runs on diesel. This automotive is not only used for traction, but also for powering one or more high potency oil pumps for activating different hydraulic drives, notably the engines and pistons. Large producers are usually equipped with this type of automotive machine, that can alone haul a plurality of agricultural equipment such as reapers and harvesters of plants, gatherers and other equipment that cut, collect and process different types of cultivations.

It can be generally noted that the known implements usually present its structure defined by the combination of many pieces in the form of metallic profiles, flat plates, folded plates and numerous other components for fixation that concur for the formation of a structure compatible to receive the different subsets.

On the other hand, it is also noted that the conventional implements have its frontal part defined by a transverse rotating piece, where many claws move the plants to the inside of the machine, brushing in a way that allows them to be cut very close to the ground, and at the same time moved to the inside of the machine.

Overtime, it has been noted that such parts could be modified. Besides weighting considerably, its structure requires also many processing operations for its plate parts. This consequently generates the necessity of many hours of welding and assembling, which make it much more expensive, while in the end the weight hiders the implement's performance.

The rotating part used for grabbing the plants and moving them back also usually has a complicated construction. Some of them even utilize a cam system, so that the claws can be correctly positioned and work as a comb or a rake, performing a movement downwards and inwards. Even though this effect is enough to stabilize the plant to be cut at its base and then be moved to the inside, it was noted that this system could be improved. It could manly be improved in the form of grabbing the plant, for as has been said before, it is ideal that each set of claws (comb) be moved by means of combined translation and rotation movements. It is expected that either of these movements will launch each comb vertically at the back of the plants, stabilizing them to be cut at its base, and simultaneously, by means of a horizontal movement, bringing them to the inside of the implement. Even though these movements are enough for the good functioning of this set, the conventional implements were not able to make the claws perform a perfect movement, one with certain inclinations to enter behind the plant, and another horizontal backwards movement to drag them at the same time they are cut. The more precise these movements are, the more efficient will consequentially be the process of reaping and windrowing, which can't be done with common equipment.

OBJECTIVE OF THE INVENTION

The first objective of the invention is a differentiated implement in reference to its lifting and gathering set. Contrary to common machinery, it is not of the rotating type; it is formed by a translating set of claws distributed in the form of parallel "combs", which are connected by their tips to sliding chains adjusted in lateral and medium structures, practically triangular and with internal gears. These gears are responsible for moving said chains in the triangular profile of the referenced structures, and this way, all the combs are equally and simultaneously moved. Each of these combs perform a translation movement around a center, that accompanies the triangular profile of the structure. Accordingly, the translation movement of each comb includes a downward portion that positions the claws behind the transversal row of plants, and then changes direction to a horizontal movement backwards. At this point the plants are stabilized and cut at their base, and the horizontal course of each comb continues and tosses the plants back, in the direction of the conveyor belts. These belts lead and drop the plants on the ground forming the windrows.

Another objective of the invention is achieving a tubular structure on four wheels, two in the front and two in the back. This tubular structure provides a way for all the sets to be assembled on it, finalizing an implement lighter and versatile when compared to conventional ones.

Another advantage of this implement is not only its reduced dimensions and weight, but also the fact that the simplified mobile parts made possible the use of small hydraulic engines for activating each set, dismissing the need of camshafts and other heavy parts. One of the advantages that also stands out is the fact the implement features different adjustable parts, strategically positioned so that the set may work according to the soil and the plant to be reaped and windrowed.

DESCRIPTION OF THE DRAWINGS

For better comprehension of the present invention, below is a detailed description of its images:

FIG. 10 shows two details in perspective, showing the frontal part of the opener set and vertical cutter.

FIG. 11 illustrates two details, one in perspective and the other in frontal view, showing the opener set and the vertical cutter.

DETAILED DESCRIPTION OF THE INVENTION

Figure 1:
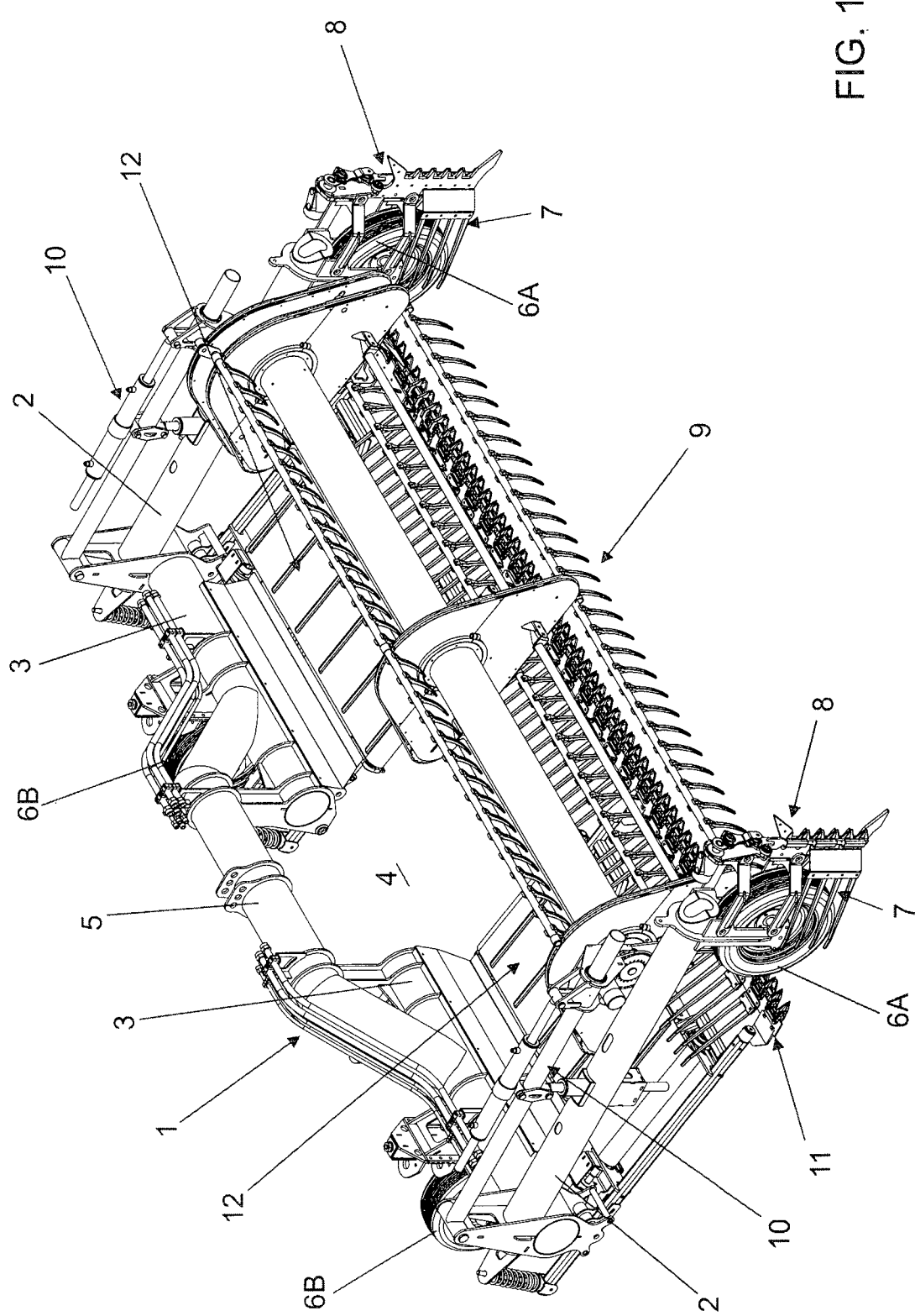
FIG. 1 represents the implement viewed at an upper frontal angle.
Figure 2:
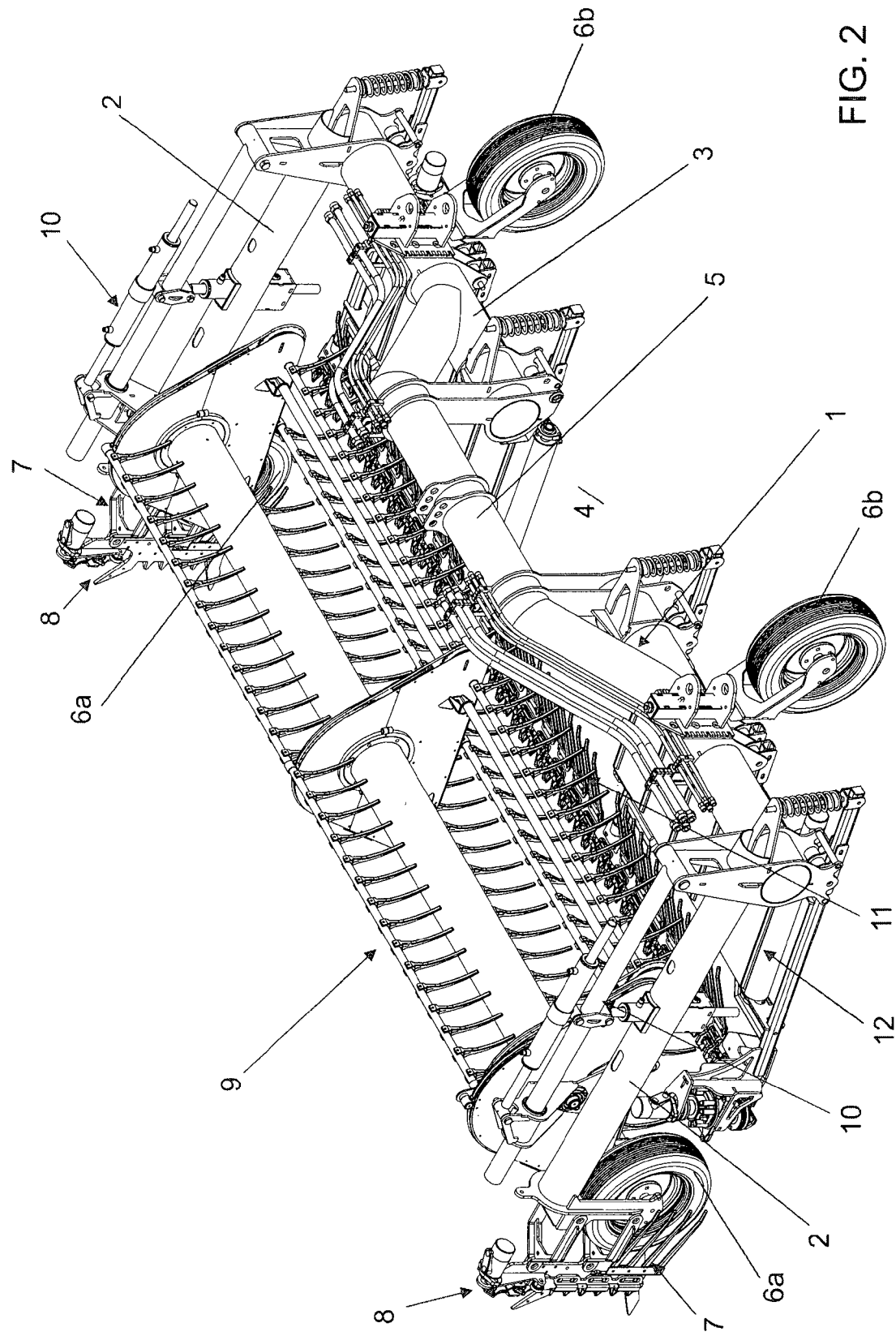
FIG. 2 is a perspective view showing the implement in an upper rear angle.
Figure 3:
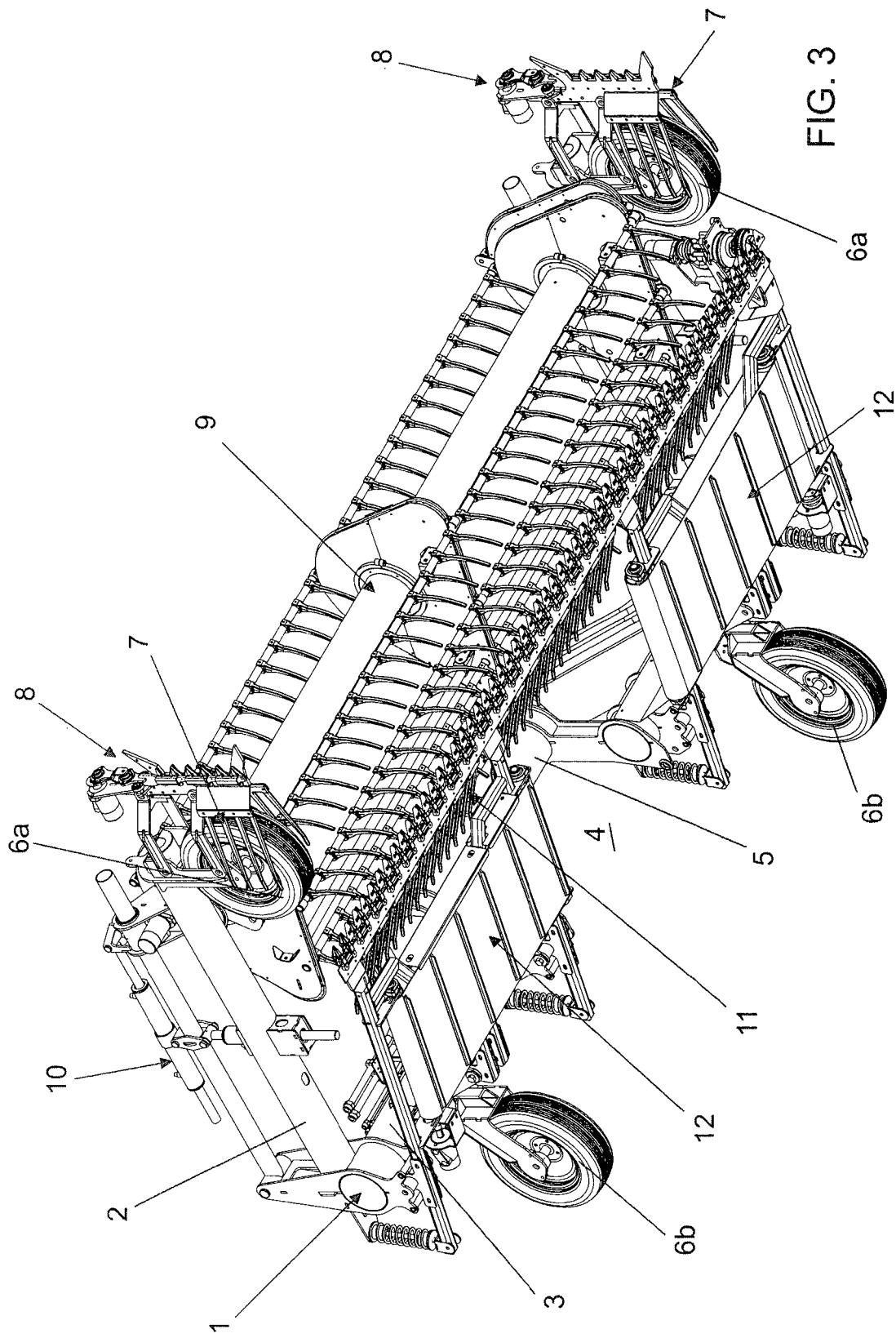
FIG. 3 illustrates a view of the implement from a lower rear angle perspective.
Figure 4:
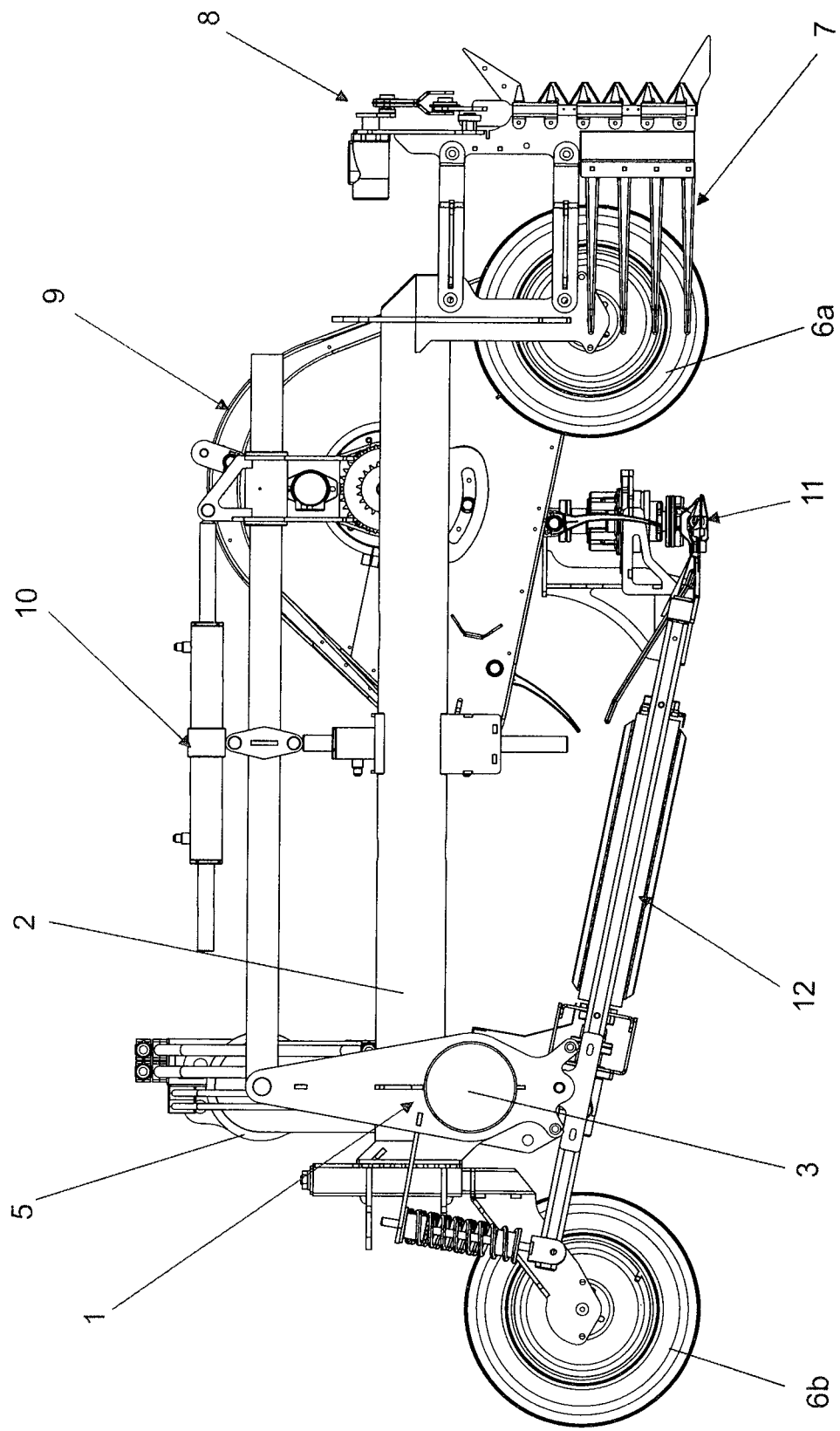
FIG. 4 is a right side view of the implement.
Figure 5:
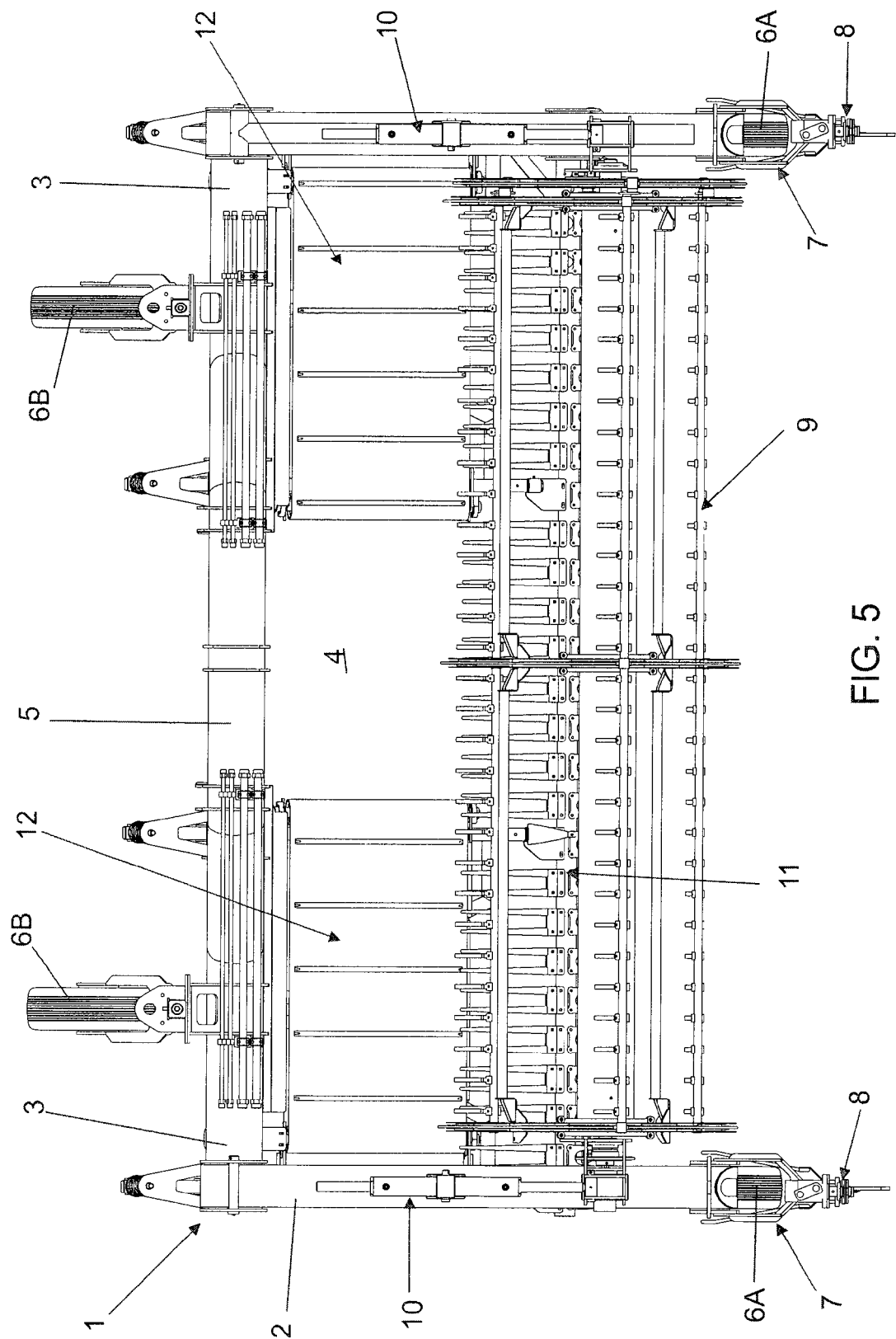
FIG. 5 is an upper view of the implement.

According to these illustrations and their details, particularly FIGS. 1 to 5, the present invention, IMPLEMENT FOR REAPING AND WINDROWING VARIOUS CULTIVATIONS, is characterized for comprising:

A tubular structure (1) in the shape of a lying down "U", composed of side tubes (2), parallel and aligned in the same plane and by a connecting rear portion made of two tubular axial segments (3) with a gap or opening (4) in between them. The structural interconnection is completed by an elevated part, also tubular and trapezoid shaped (5), forming the rear elevated part of said structure and which serves as an exit for the windrowed material. The frontal part is represented by the side tubes (2), with which the set takes the form of a lying down "U" and is supported by the frontal (6A) and rear wheels (6B). The frontal wheels (6A) are mounted on the distal ends of the tubes (2), while the rear ones (6B) are mounted on the median tubular segments (3) in a way that the entire structure may be supported on the ground by them.

Two sets of openers (7) integrated with the vertical cutter sets (8), mounted in front if each front wheel (6A), in which the set of openers (7) are responsible for opening way and separating the plants to be reaped from the side rows which won't be reaped or are out of the reach of the machine. Simultaneously, the vertical cutting devices trim the branches that could eventually cause a blockage, trimming the plant vertically, and in this case, the fallen cluster can be from plants that might or might not be gathered by the implement.

A gathering and lifting set (9) which extends for the whole width of the implement between the frontal wheels (6A). Its ends are adjustably attached to oscillatory arms (10) which are placed over the side tubes (3). These arms allow said gathering and lifting set (9) to be moved vertically and horizontally according to a desired adjustment coherent with the surface of the ground and according to the type of plant being reaped and windrowed. This gathering and lifting set (9) is responsible for selecting a row of plants corresponding to the width of the machine, pulling it inward and upward, at the same time as the reaping.

A reaping set (11) assembled along the entire transversal extension of the machine, forming a transversal cutting line kept over the soil. This reaping set is assembled on the structure (1) in a spring manner that allows the cutting line to follow the level of the ground. With the forward movement of the set, the plants are cut simultaneously at the base and in all the transversal extension of the machine, concomitantly with the work carried out by the gathering and lifting set (9). The plants reaped are moved backwards and enter the phase of windrowing.

A windrowing set (12) positioned transversally between the reaping set (11) and the tube segment (3) of the structure (1), including an opening (4), in a way that the reaped plants can pass through it continuously and form the windrows on the ground.

Figure 6:
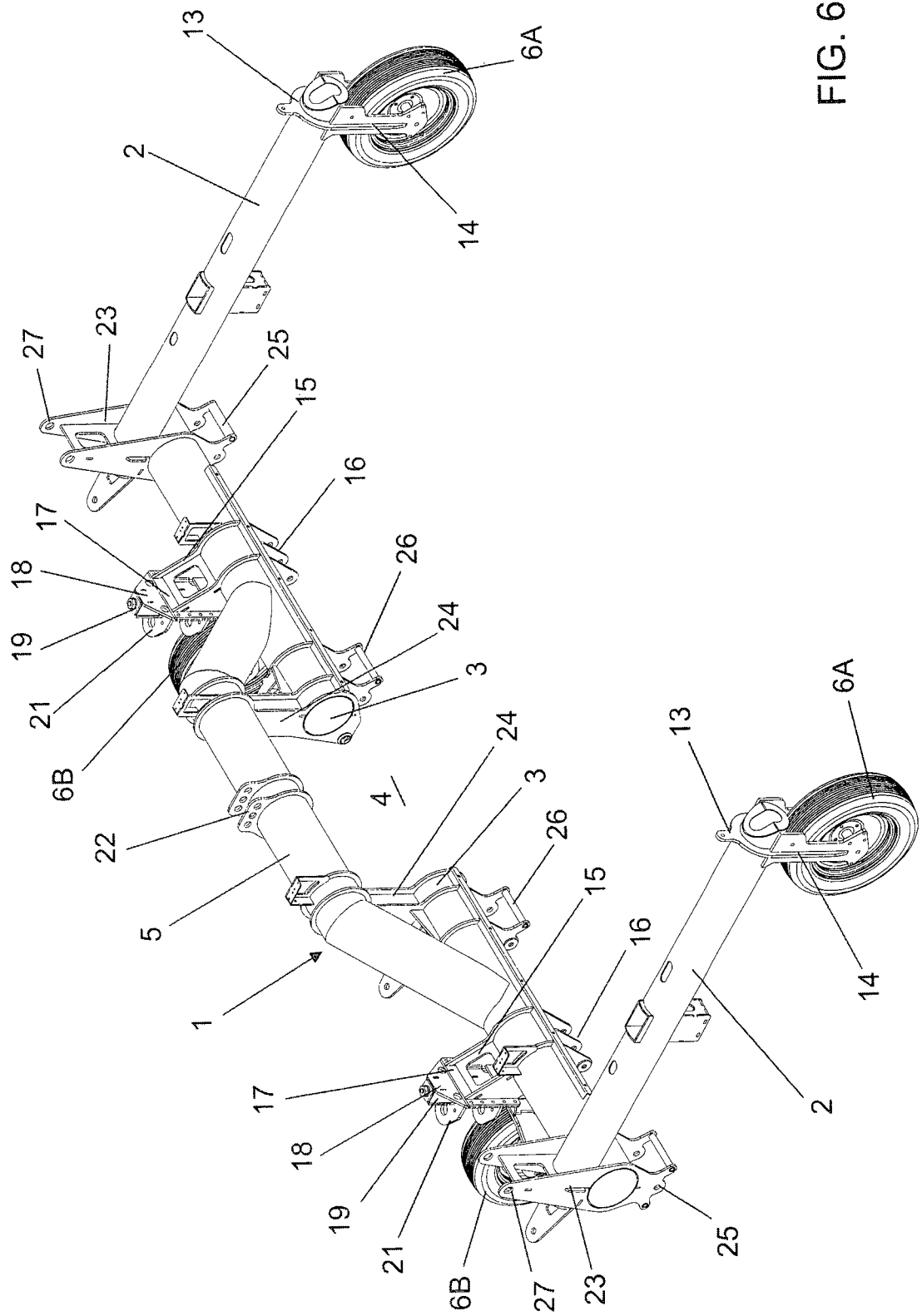
FIG. 6 reproduces a perspective in an upper frontal angle showing only the tubular structure of the implement.
Figure 7:
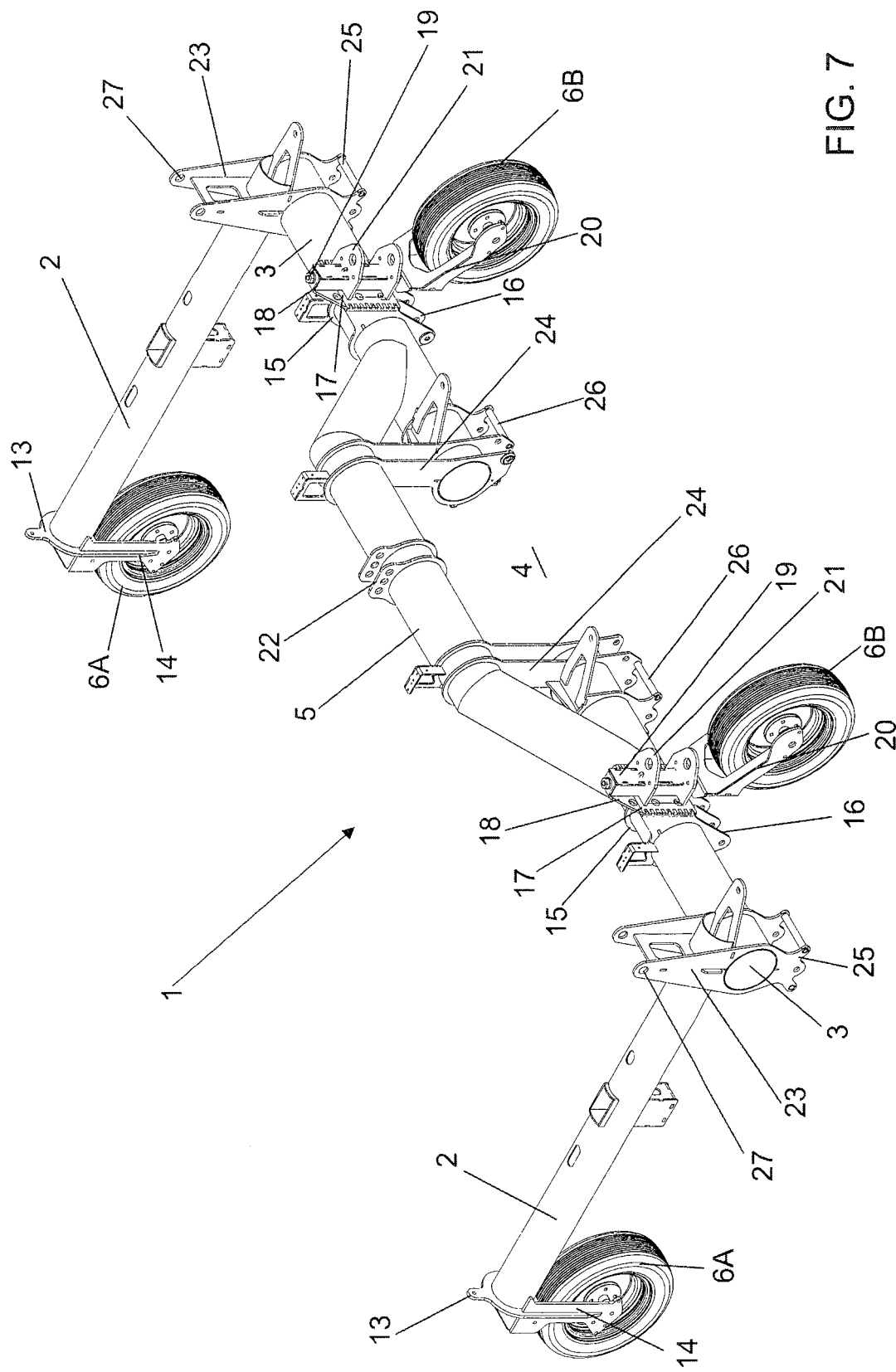
FIG. 7 shows the same structure as the figure before it, but in a frontal upper angle.
Figure 8:
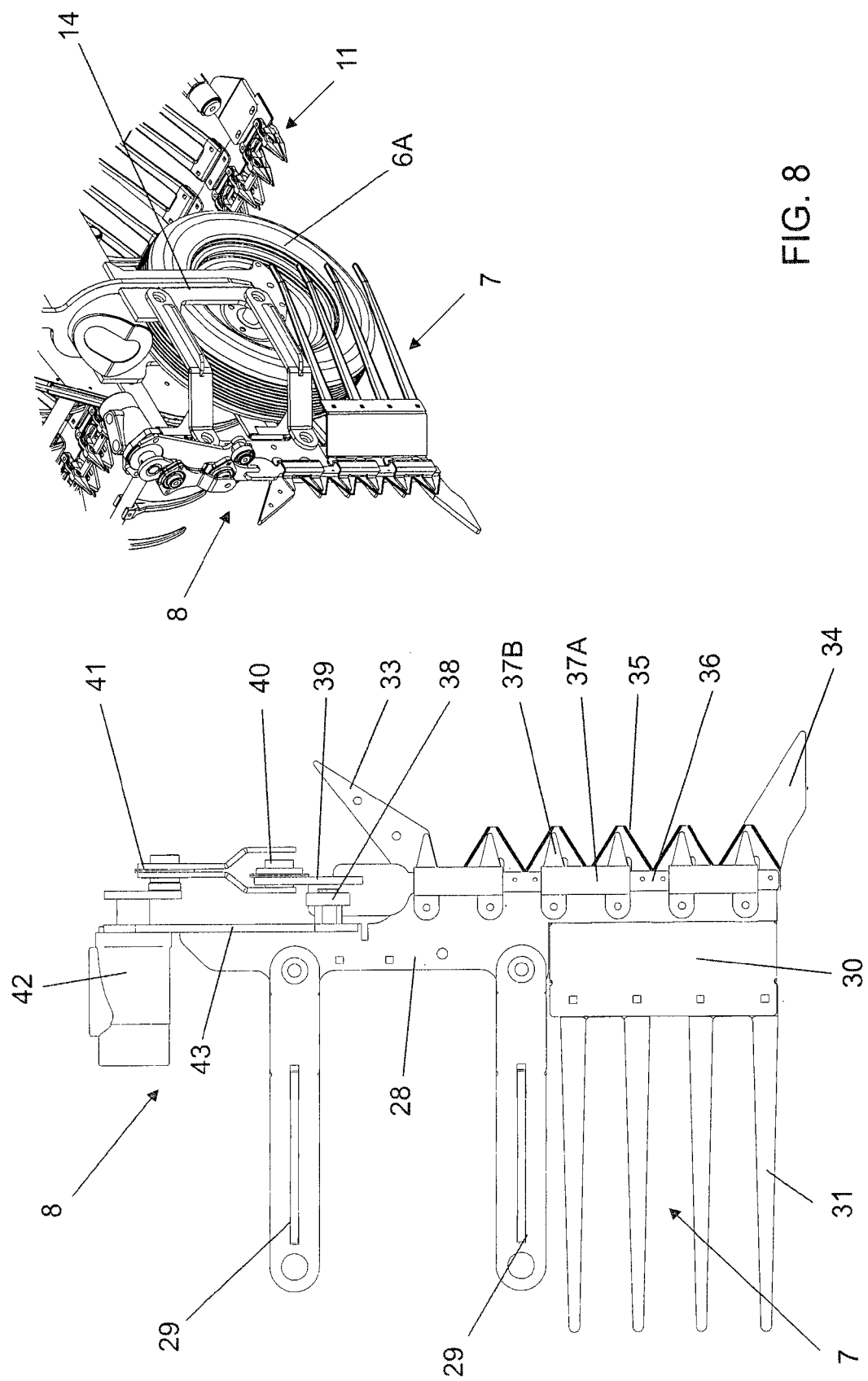
FIG. 8 shows a separated detail in perspective and a separated detail in a side view, particularly showing the details of the opener set and the vertical cutter.

As illustrated by FIGS. 6 and 7, the tubular structure (1) in "U" shape features various strategic supports for the assembling of the sets previously described, such as plate forks (13) with circular fitting spaces for coupling to the distal extremities of the tubes (2). These forks have its tips facing down and receive complementary plate pieces (14), which have in between them the frontal wheels (6A) with its respective axis and cube. The rear wheels (6B) include supports of similar pressed plates (15), with a circular fitting opening for the tubular segment (3) and prolongations which that set up lower bearings (16) and a vertical mirror (17). This mirror levels a vertical mounting support for the height adjustable fixation of a counter plate (18) and a square tube equally vertical (19). On the inside of this square tube is fixed the fork (20) of the wheels (6B), and in this set, there are a pair of flaps (21) which work together with plate rings (22) positioned in the middle part of the trapezoid shaped tube (5), in being the slots used for coupling the implement to the front of the tractor.

Continuing to reference FIGS. 6 and 7, another two assembling support sets, (23) and (24), are planned. The first of these interconnects in 90° the rear ends of the side tubes (2) and one of the transversal tubes (3). The other (24) interconnects the upper part of the trapezoid shaped tube (5) with the other corresponding ends of the tubes (3) of the structure (1). All supports (23 and 24) are equally made of parallel plates with the circular openings for the corresponding tube parts of the structure (1) and extend upward and downwards, setting up lower (25, 26) and upper (27) bearings for articulated coupling of the different sets of the implement. Lower bearings (25) for the reaping set (11), lower bearings (26) for the windrowing set (12) and finally upper bearings (27) for the assembling structure (10) of the gathering and lifting set (9).

FIGS. 8 to 11 show in detail the opener sets (7) integrated with the vertical cutter set (8), assembled in front of the of each front wheel (6A). Each of these sets is formed by a fixed plurality of plates (28), as if it were a vertical ruler, in whose borders are fixed two equal supports ordinarily "Y" shaped, or in the form of forks (29). These horizontal supports face backwards and the distal tips of their ramification envelop the frontal wheel (6A) and are fixed on the wheel's side plates (14), while by its opposite end it is fixed on the corresponding edge of plate piece 28. On this same edge of plate piece 28, below forks 29, it features a pair of plate pieces positioned in a "V" shape (30), mirrored and equally positioned, from which extend various ribs or rods, (31) which like the forks above it, envelop the front and sides of the front wheels (6A). In this manner, both forks and ribs contribute in opening way to said wheels by diverting the plant ramifications, and maintaining their wholeness while positioning them correctly during their process of being reaped and windrowed.

Figure 9:
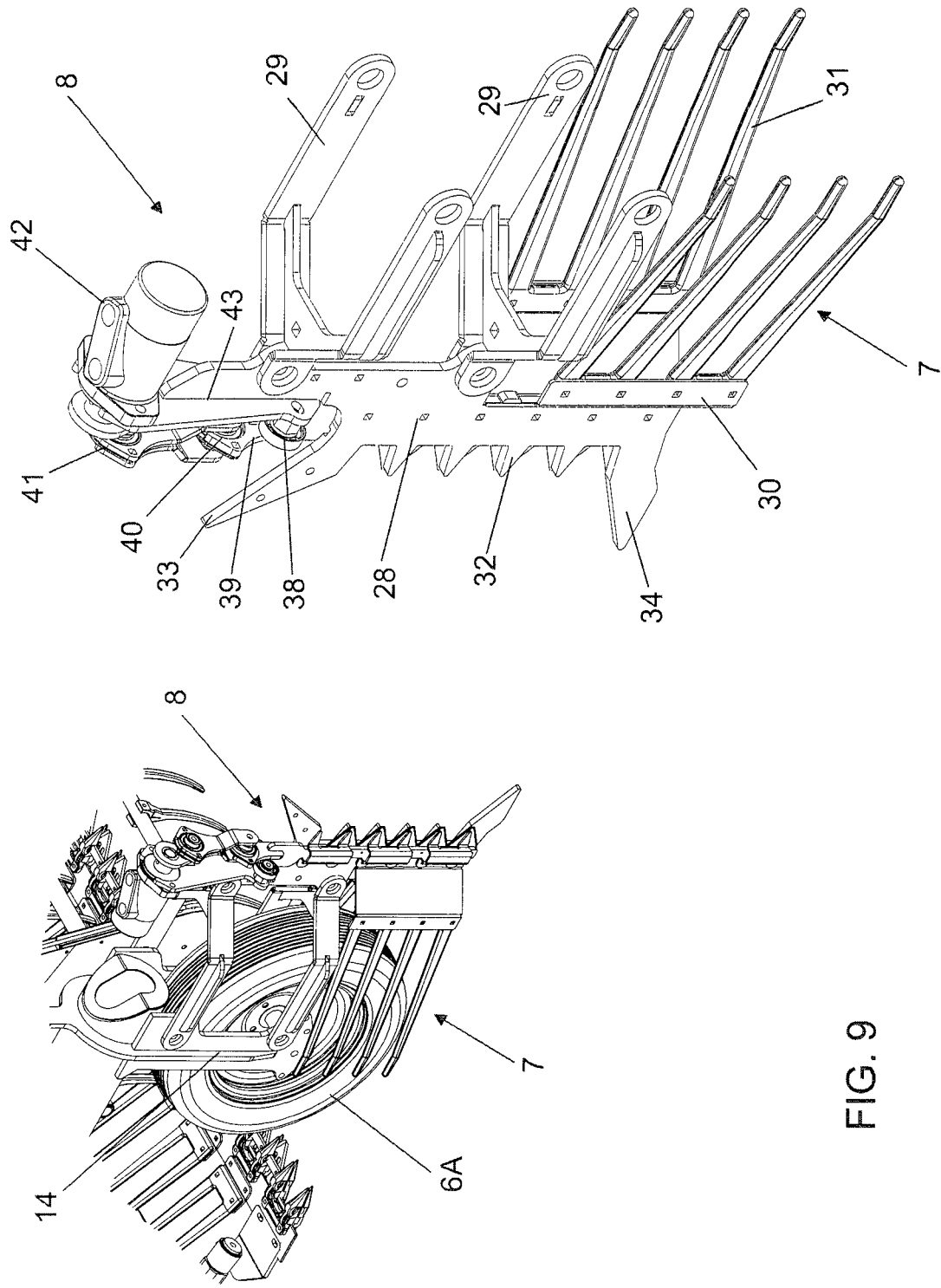
FIG. 9 represents two details in perspective, showing the frontal and rear parts of the opener set and the vertical cutter.

Still referencing FIGS. 8 to 11, the cutting set (8) is assembled along the frontal edge of plate slab (28), and as FIGS. 9 and 10 show, this edge extends forward featuring a row of triangular cutting teeth (32). Two of these are significantly longer: The upper (33) is elongated with an upward inclination, and the bottom one (34) is elongated with a downward inclination. They both also function as guides to funnel the plants toward the triangular cutting teeth (32), which like scissors, function together with another set of moving teeth (35) assembled along a moving plate piece. This piece is mounted in a sliding manner on the inside of strainers (37A) with fixed teeth (37B), fixed on plate piece 28. This way, the mobile teeth (35) stay in between the fixed teeth 37B and 32. The before mentioned moving plate piece (36) has its upper end guided in between bearings (38) and is orthogonally connected through this same end to a prolonging (39), that by means of articulation (40), is connected to an cam set (41) and its respective triggering set by hydraulic engine (42) assembled on a support (43) that not only serves as a base for the two bearings, (37) but is fixed to plate piece 28.

Figure 12:
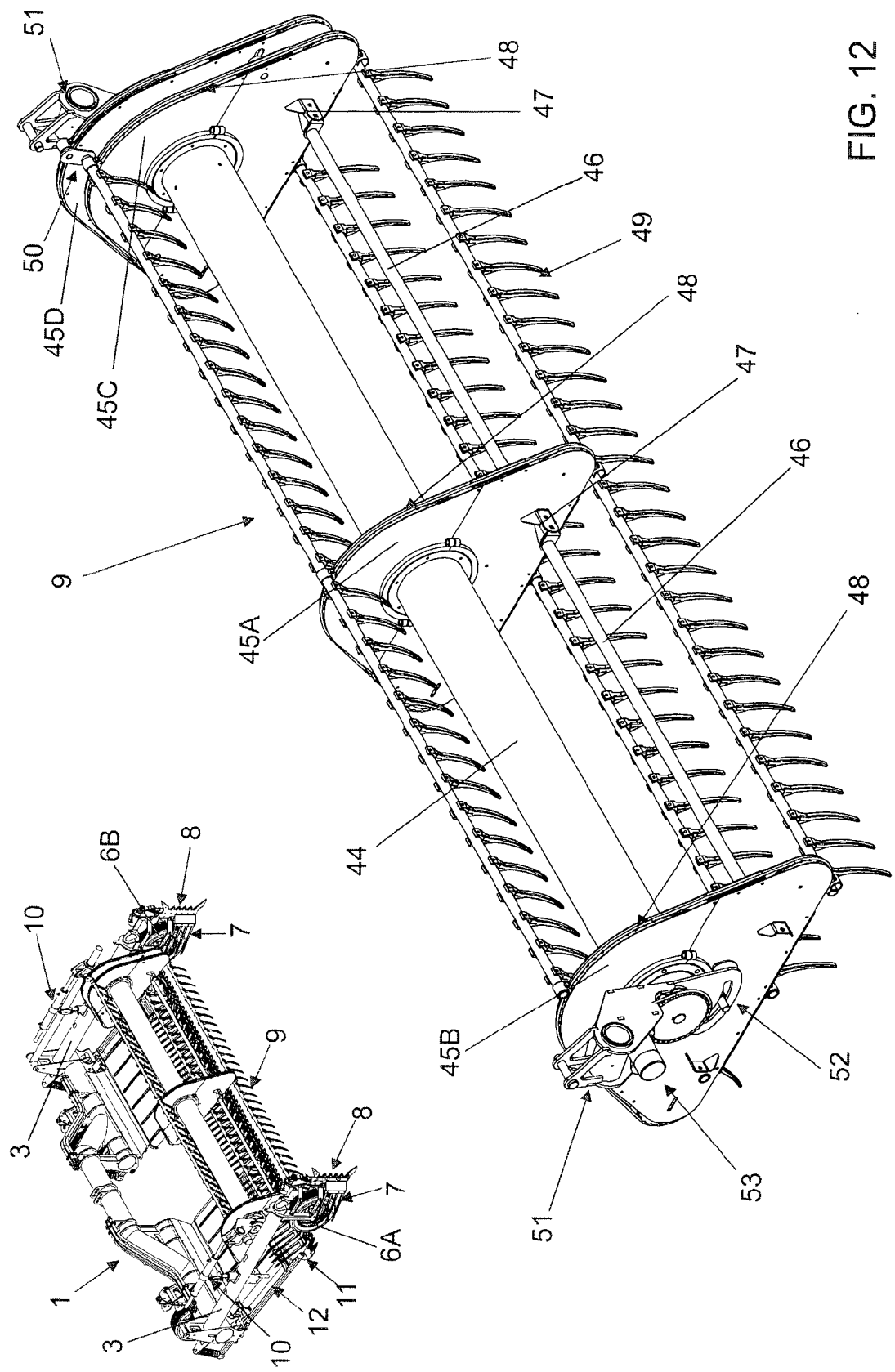
FIG. 12 are isometric views in an upper angle showing details of the gathering and lifting set.
Figure 13:
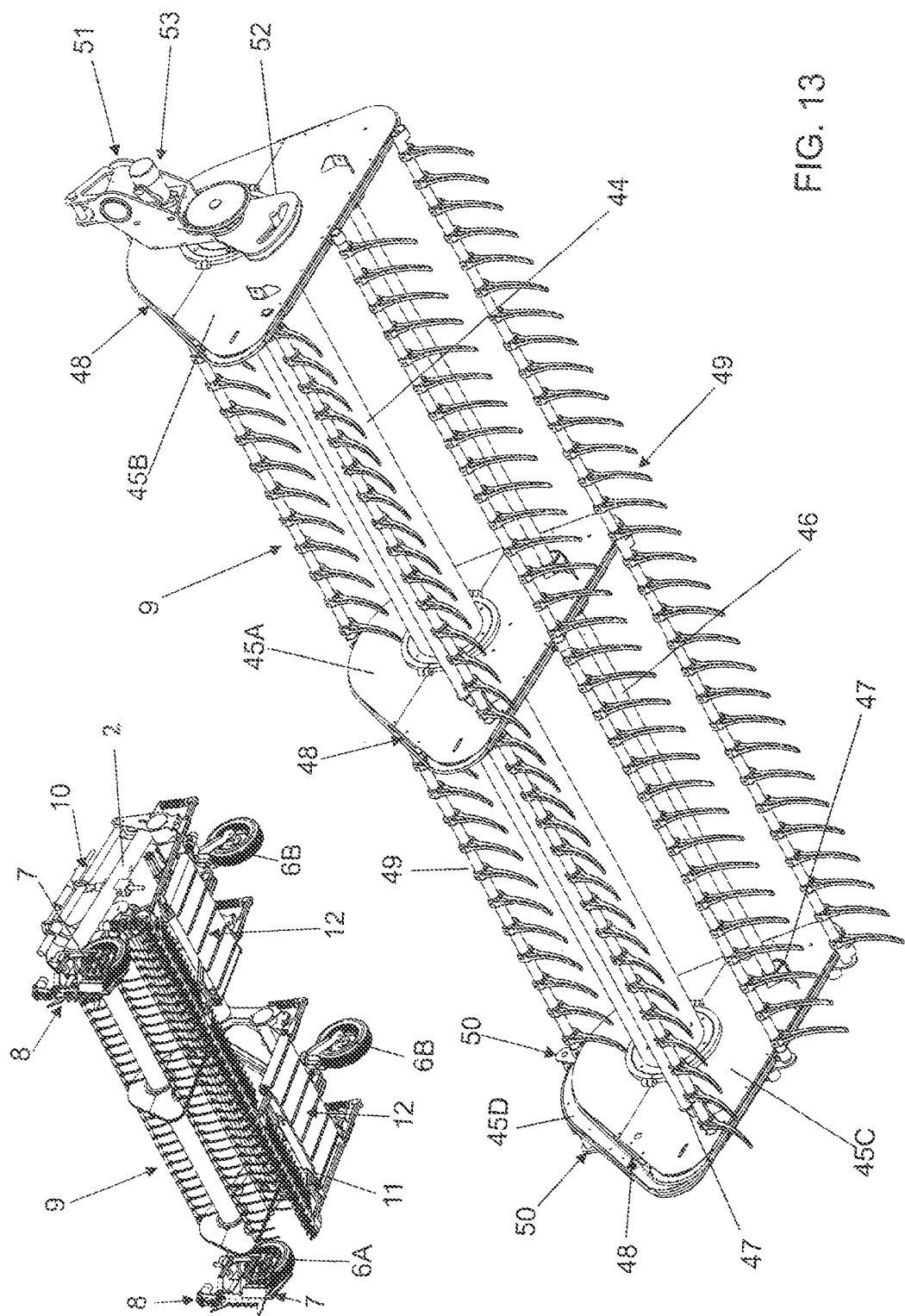
FIG. 13 shows lower angle isometric views of other details of the gathering and lifting set.
Figure 14:
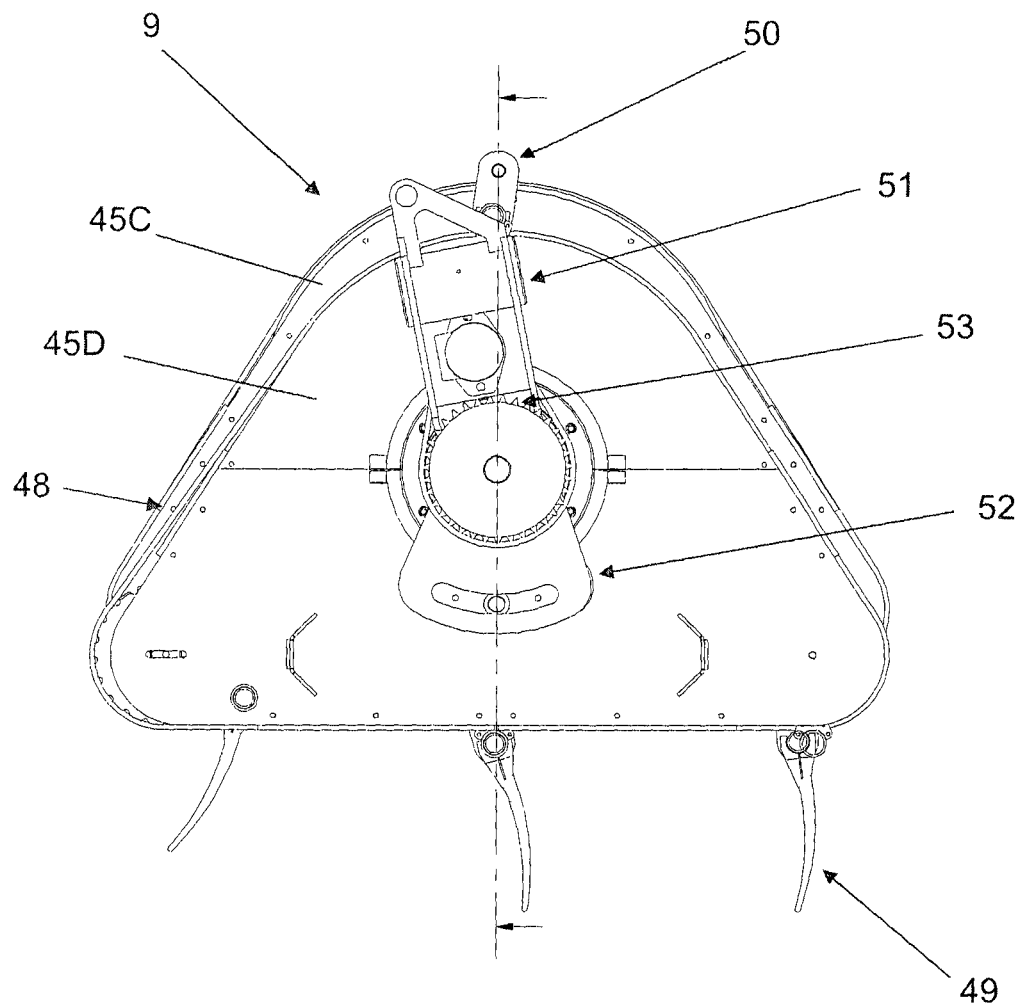
FIG. 14 reproduces a side view highlighting the profile of the gathering and lifting set.
Figure 15:
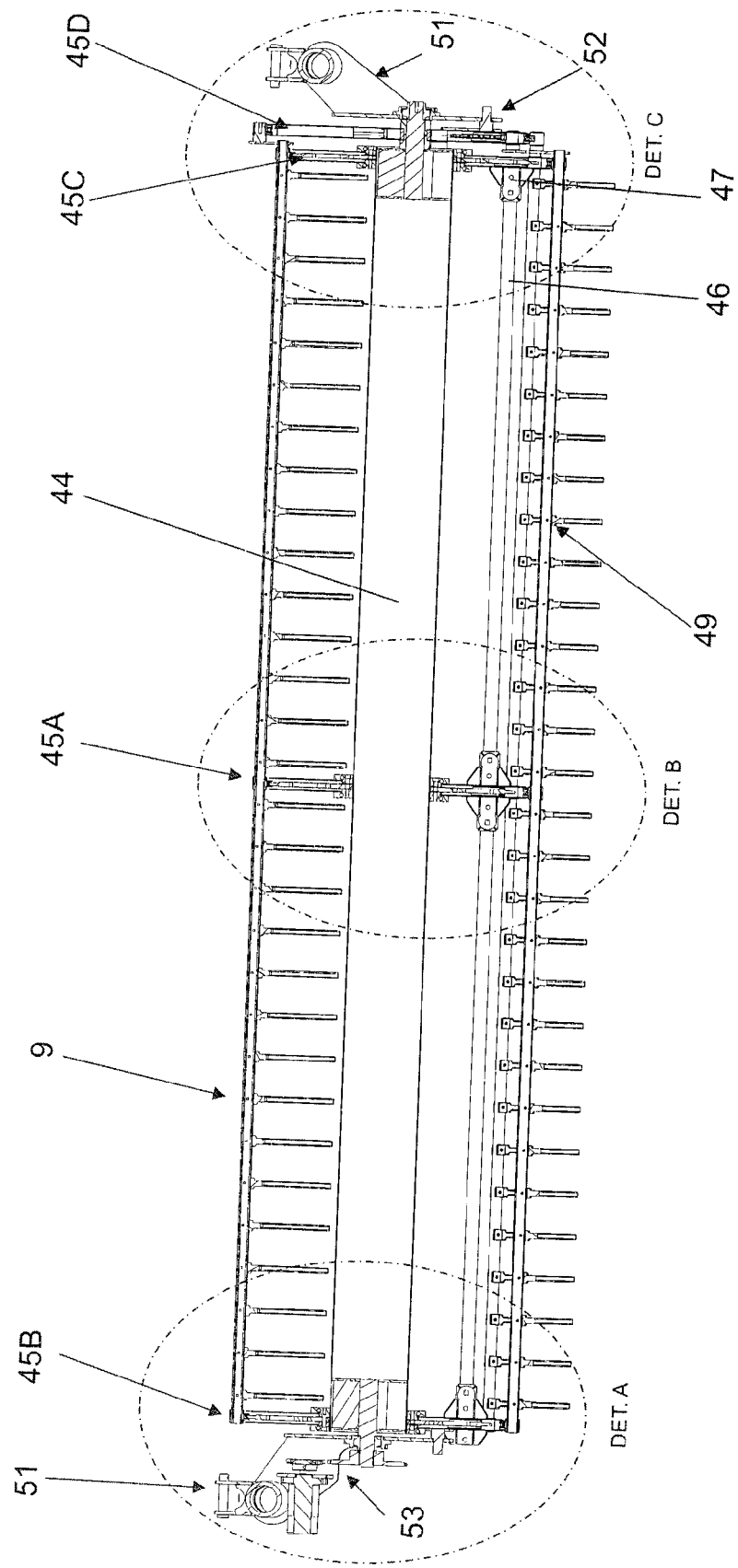
FIG. 15 is a cross sectional view on the line indicated in the previous figure showing the gathering and lifting set.
Figure 16:
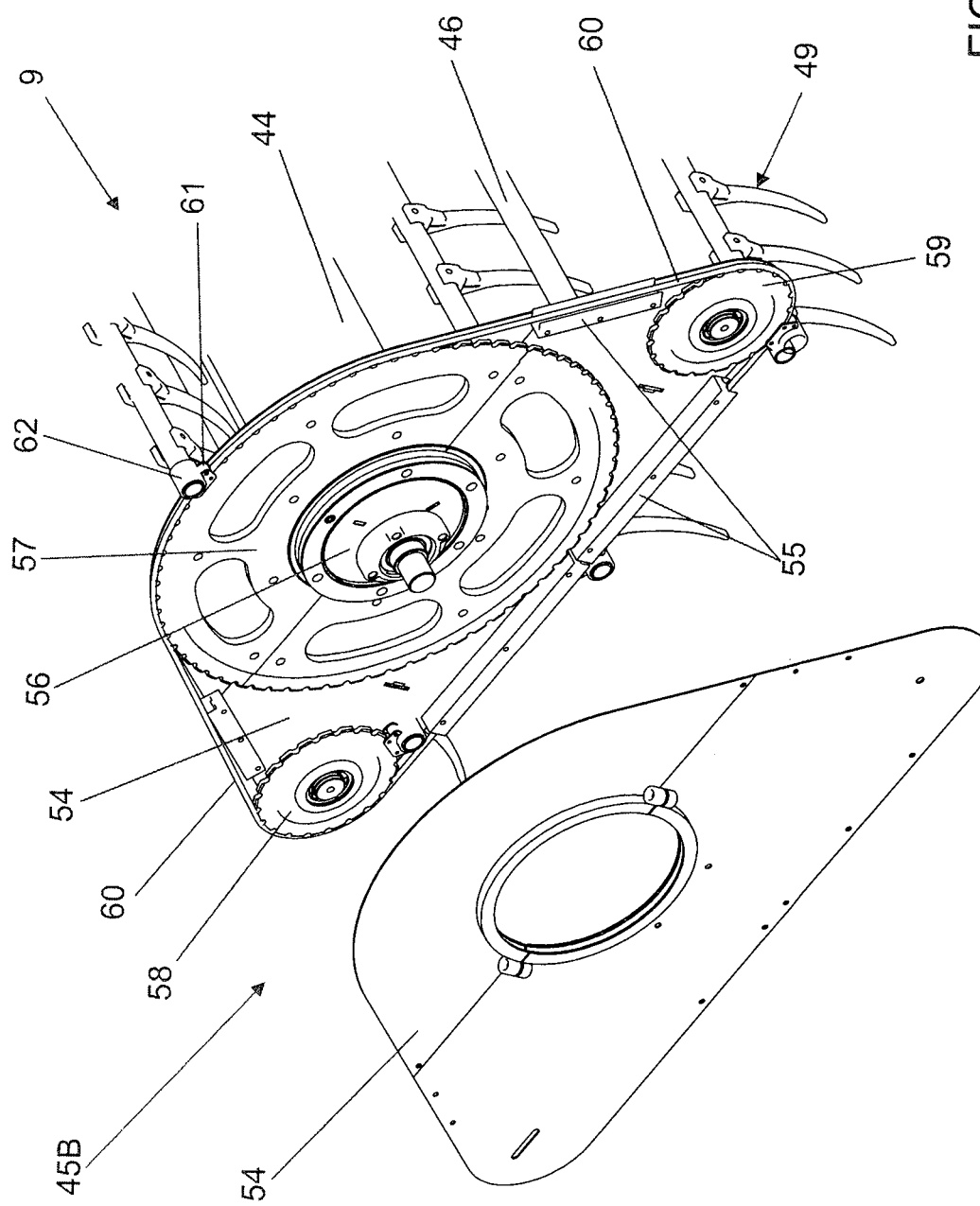
FIG. 16 shows a magnified detail in perspective highlighting one of the transmission boxes of the gathering and lifting roller, and in this case, the lid or side closing is dislocated.
Figure 17:
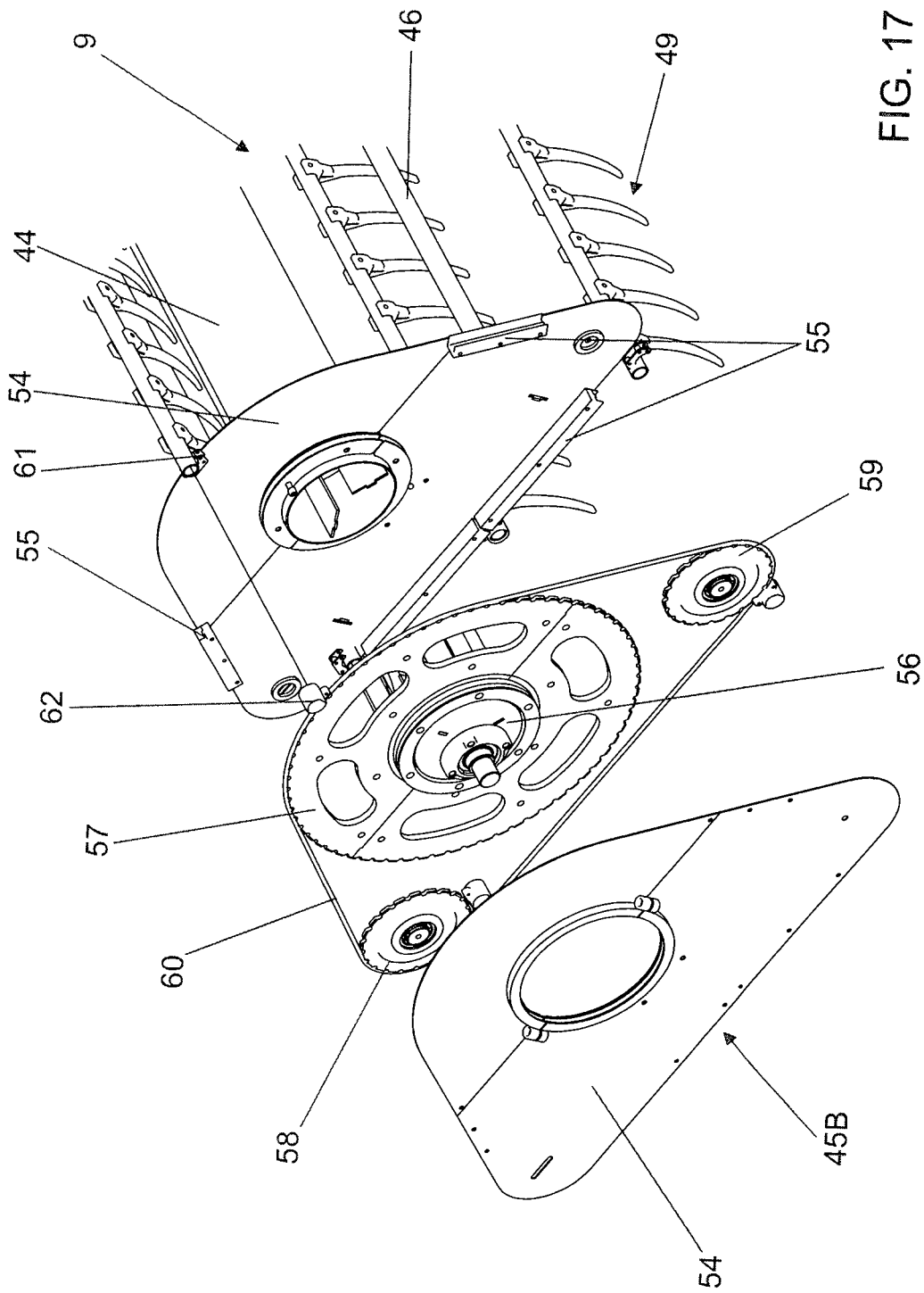
FIG. 17 is a view of the same details showed in the previous picture, but exploded for viewing purposes.
Figure 18:
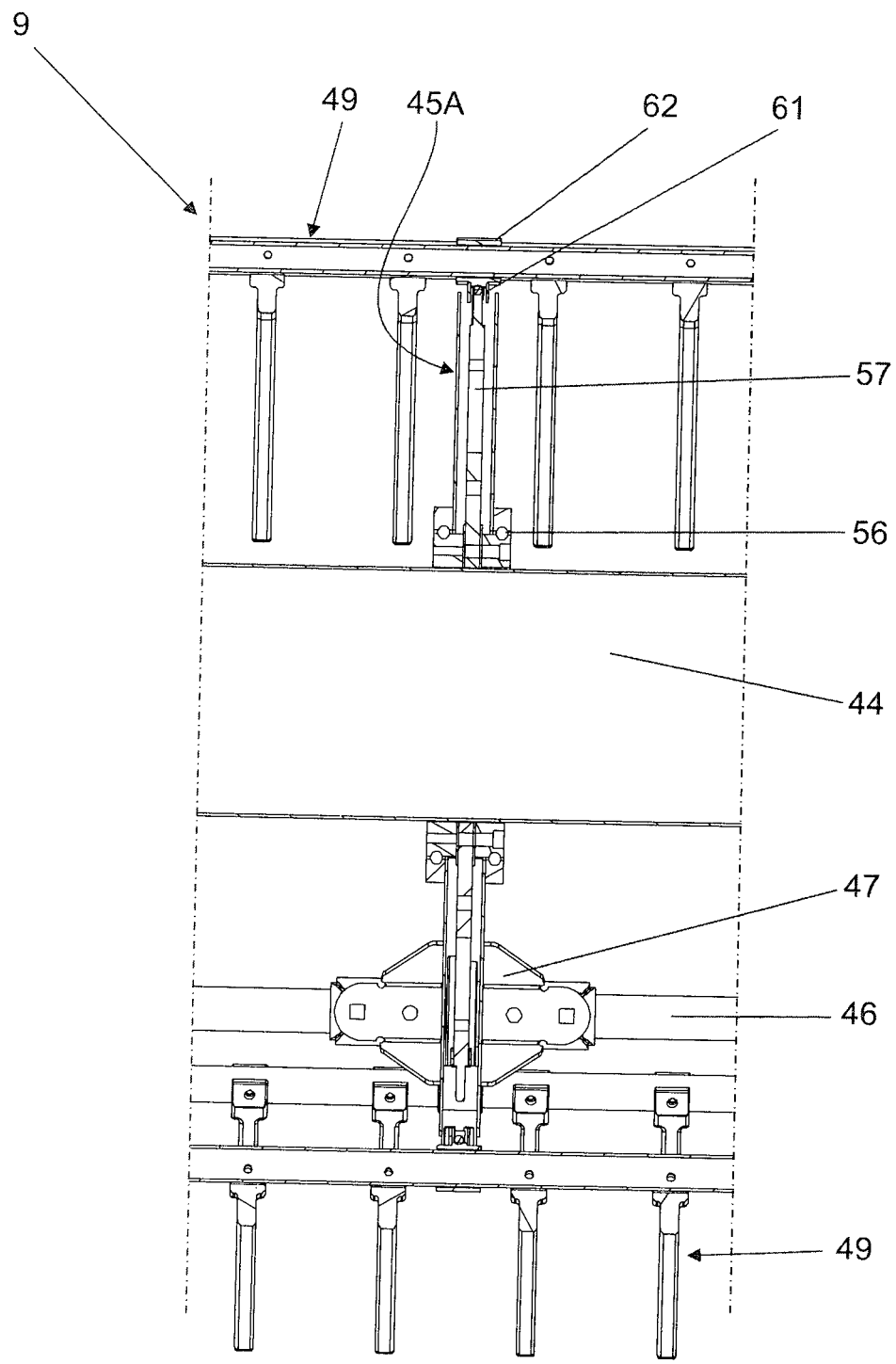
FIG. 18 shows detail "B" magnified, indicated in the cross sectional view in FIG. 15.

In relation to FIGS. 12, 13 and 14, the gathering and lifting set (9), as has been said before, occupies the entire width of the implement between the front wheels (6A). Its ends are adjustably fixed to a complementary tubular structure (10), which swivels and extends over the side tubes (3). This complementary structure provides means for said gathering and lifting set (9) to be moved horizontally and vertically to conform to a desired position coherent with the surface of the soil and according to the type of plant being reaped and windrowed. This gathering and lifting set (9) is responsible for selecting a lane of plants corresponding to the width of the machine, moving it inward and upward, at the same time as the reaping phase. For this, this set consists of a structure defined by a rotating central tubular axis (44), which passes through three boxes of transmission and synchronism: One in the middle (45A) and two at the opposite sides (45B e 45C). Beside box 45C is a forth transmission box (45D). They are all equally aligned and triangular shaped with rounded edges, have the same dimensions and have a vertex pointing up, and a side pointing down. These triangular shaped boxes also feature stabilizing bars (46) with their respective supports (47). At least two bars in each space between the transmission and synchronism boxes (45ABC), boxes that also have its outline equipped with a dragging device, (48) where there are attached many equally distant combs (49) positioned in a parallel manner to travel simultaneously in complete and continuous movement along the outline of said boxes (45ABC). A stable movement that always keeps each comb in a vertical position through a complementary device (50) assembled in the outline of box 45D. In its side facing outward, box 45D has a bearing support (51) for axis 44 and a device for regulating the inclination (52) of the gathering and lifting roller (9). That is, on the external side of box (45B), aside from support 51 and the inclination-regulating device 52, this set (9) sustains and integrates the parts of the triggering set of the rotating axis (44).

The transmission and synchronism boxes (45A, 45B and 45C) shown in detail in FIGS. 15 through 18 are practically identical, having two walls of metal plate (54), ordinarily triangular with rounded edges, parallel to each other and also spaced apart by segments of "U" shaped profiles (55) facing outward distributed along the three borders. These triangular metal plates also feature pieces that set up a central bearing (56) providing rotating support for an axis (44), and is also the base for a large gear (57) whose diameter is sufficient to coincide with the radius of the rounded upper edge of the corresponding transmission box (45A), (45B) and (45C). On the other two lower rounded edges, in the same manner, are positioned other smaller gears (58) and (59), with bearings in between the two plate walls (54). All three gears together (57, 58 and 59) drive a chain (60) that in turn, passes through the inside of the "U" shaped guides (55) and link to the corresponding support (61) and respective bushings (62), where the combs (49) are rotationally supported and moved by the chain (60).

Figure 19:
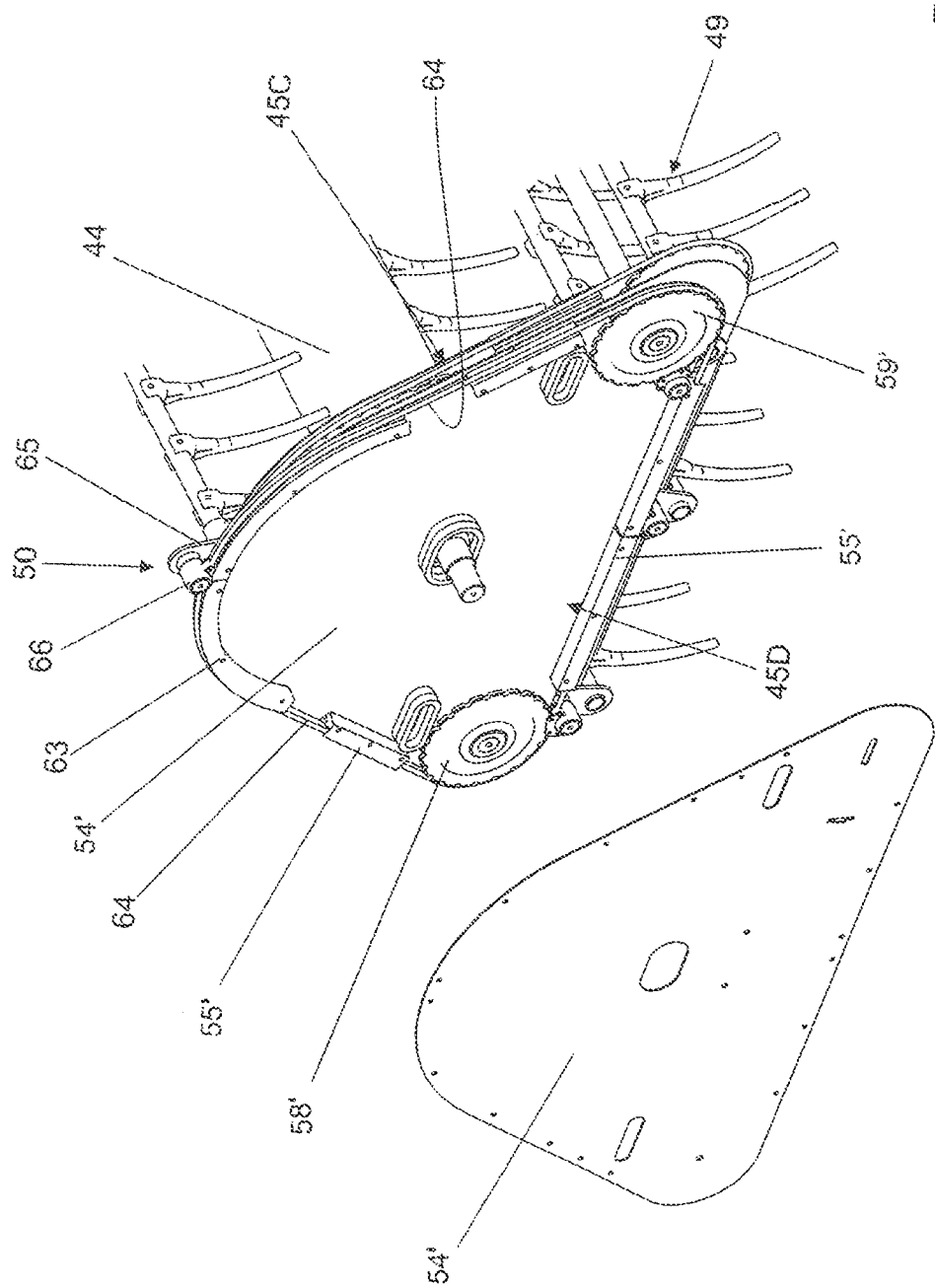
FIG. 19 represents a perspective partially exploded in detail "C" indicated in FIG. 15, highlighting another transmission box of the gathering and lifting roller.
Figure 20:
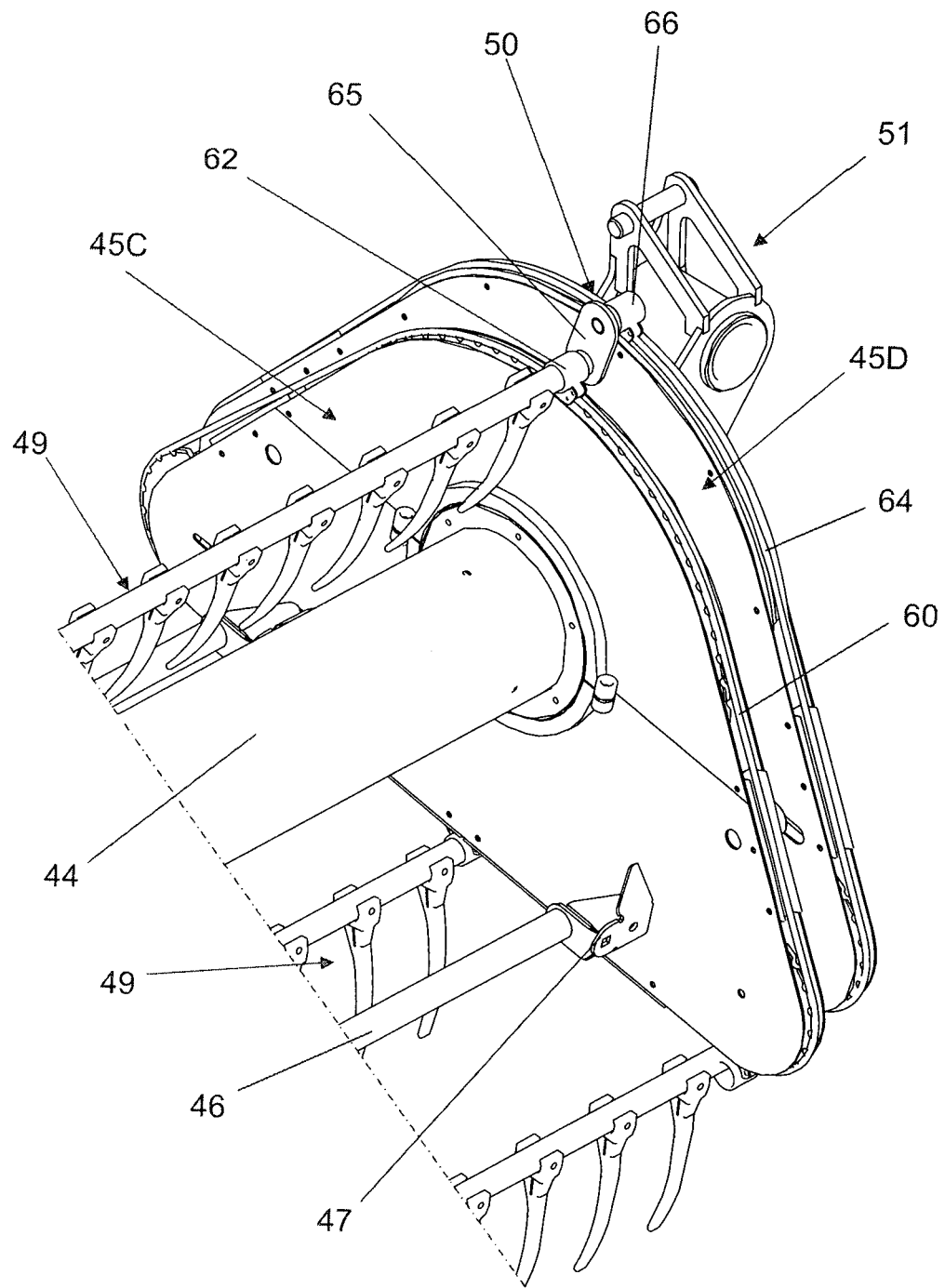
FIG. 20 shows a magnified perspective of detail "A" indicated in FIG. 15, highlighting the activating and inclination regulating devices of one of the transmission boxes of the gathering and lifting roller.

The forth transmission box (45D) is illustrated in FIGS. 19 and 20, where it can be seen that it is set in a position a little bit above the other three boxes, and that it is also made of plate walls (54) spaced apart by "U" shaped guides (55). It includes the same gears 58 and 59, but does not include the large gear in the upper rounded edge. This last one is substituted by another practically semicircular "U" shaped guide (63) in whose interior is the passage of chain 64, in which are coupled all the pantographic devices (50). These devices are crank shaped with a vertical piece (65). They are through one end articulately attached to a support (66), which in turn is fixed on the chain (64), while its other end is rigidly fixed to one of the sides of the corresponding comb (49). In this manner, when the chains (60 and 64) move in the same speed and direction, all combs are equally moved around the boxes (45ABCD), and at the same time kept in the vertical position in relation to the device (50), and of the differentiated positioning of box (45D). Because of it is position a bit above the others, the vertical link (65) always stays in a vertical position independently of where it is positioned around the set of boxes (45ABCD).

As cited before, the boxes (45BD) illustrated in details in FIGS. 21 to 25 have in its outward facing side, the bearing support 51 for the axis 44 and an inclination regulating device (52) of the gathering and lifting roller (9). That is, on the external side of box (45B), aside from support 51 and the inclination-regulating device 52, this set (9) sustains and integrates the parts of the triggering set (53) of the rotating axis (44).

Support 51 is formed by two bearings orthogonally positioned, an upper (67) and a lower one (68). The first of these is set up by a liner plate piece welded in "U" shape (69), which coupled with a trestle (70), forms a fitting for the swinging arm (10) where the gathering and lifting roller (9) can slide forward and backwards up to an adequate position for its functioning. The second bearing (68) forms a point of articulated anchorage for one of the ends of axis 44, through the triggering set (53).

Continuing to reference FIGS. 21 to 24, the triggering set (53) is formed by a hydraulic engine (71), a transmission of two gears (72 and 73) and a chain (74) and an axis tip (75). This tip is connected to the corresponding end of tubular axis (44), while the opposite end passes through the plate wall (54) and the lower bearing bush (68), receives the larger gear (72) that is interconnected to the smaller gear (73), which in turn is fixed to the axis of the hydraulic engine (71), whose flange is fixed to the support itself (51).

Figure 21:
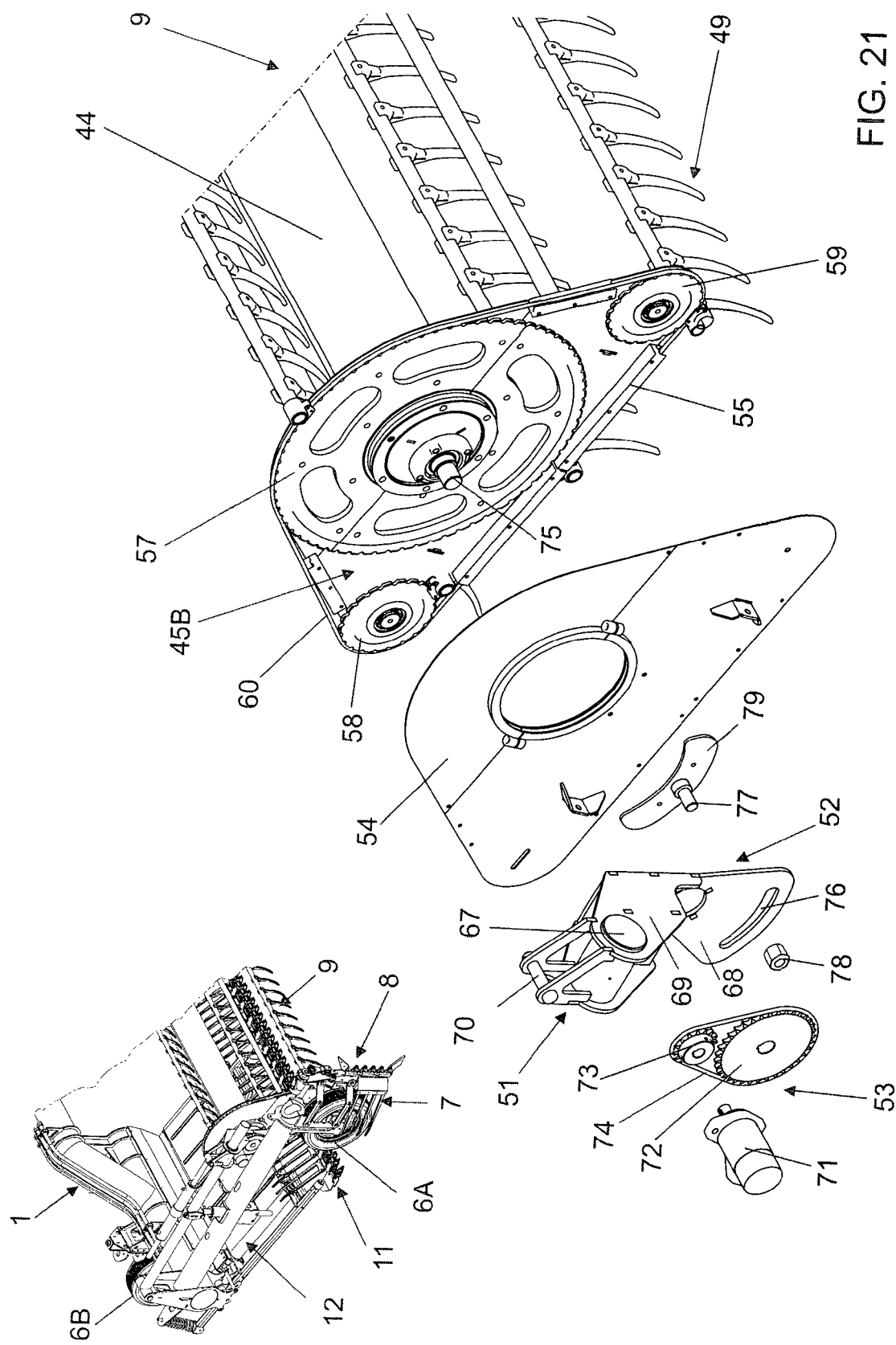
FIG. 21 illustrates an exploded perspective of detail "A" indicated in FIG. 15, highlighting the activating and inclination regulating devices of one of the transmission boxes of the gathering and lifting roller.
Figure 22:
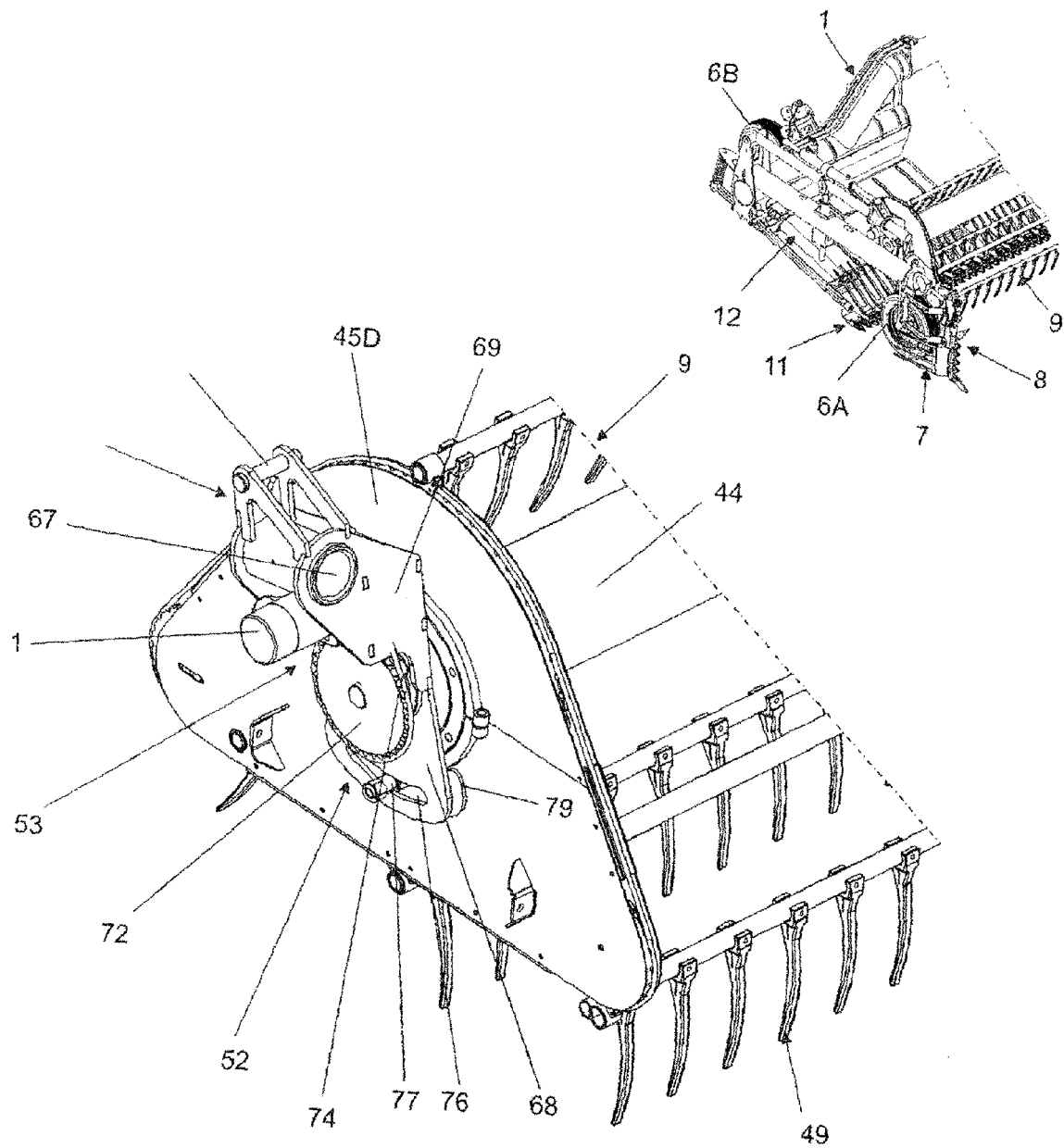
FIG. 22 is a perspective of detail "A" assembled, indicated in FIG. 15, highlighting the activating and inclination regulating devices of one of the transmission boxes of the gathering and lifting roller.
Figure 23:
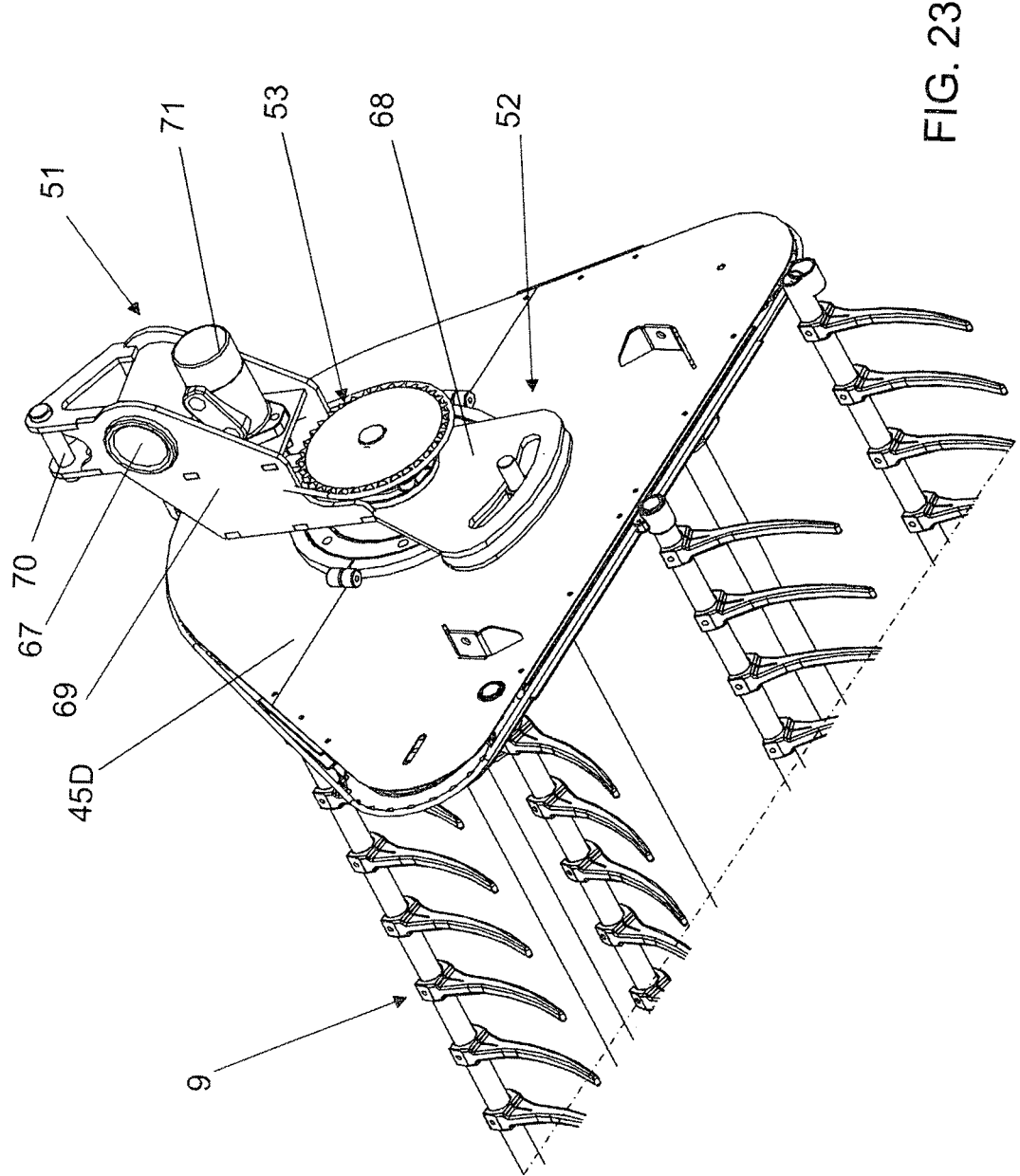
FIG. 23 is another perspective of detail "A" assembled, indicated in FIG. 15, highlighting the activating and inclination regulating devices of one of the transmission boxes of the gathering and lifting roller, but from a low angle.
Figure 24:
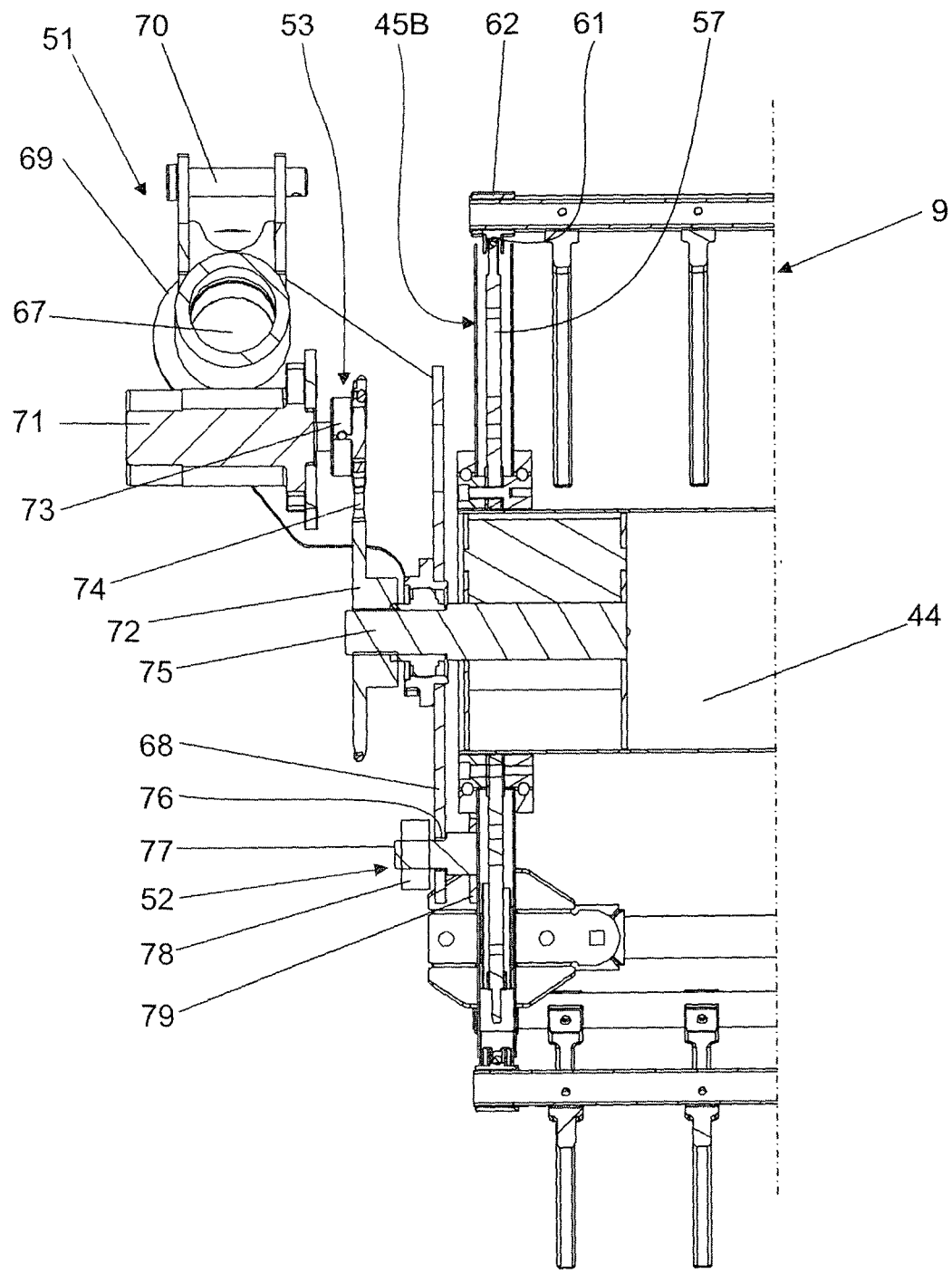
FIG. 24 reproduces a magnified view of detail "A" indicated in FIG. 15.
Figure 25:
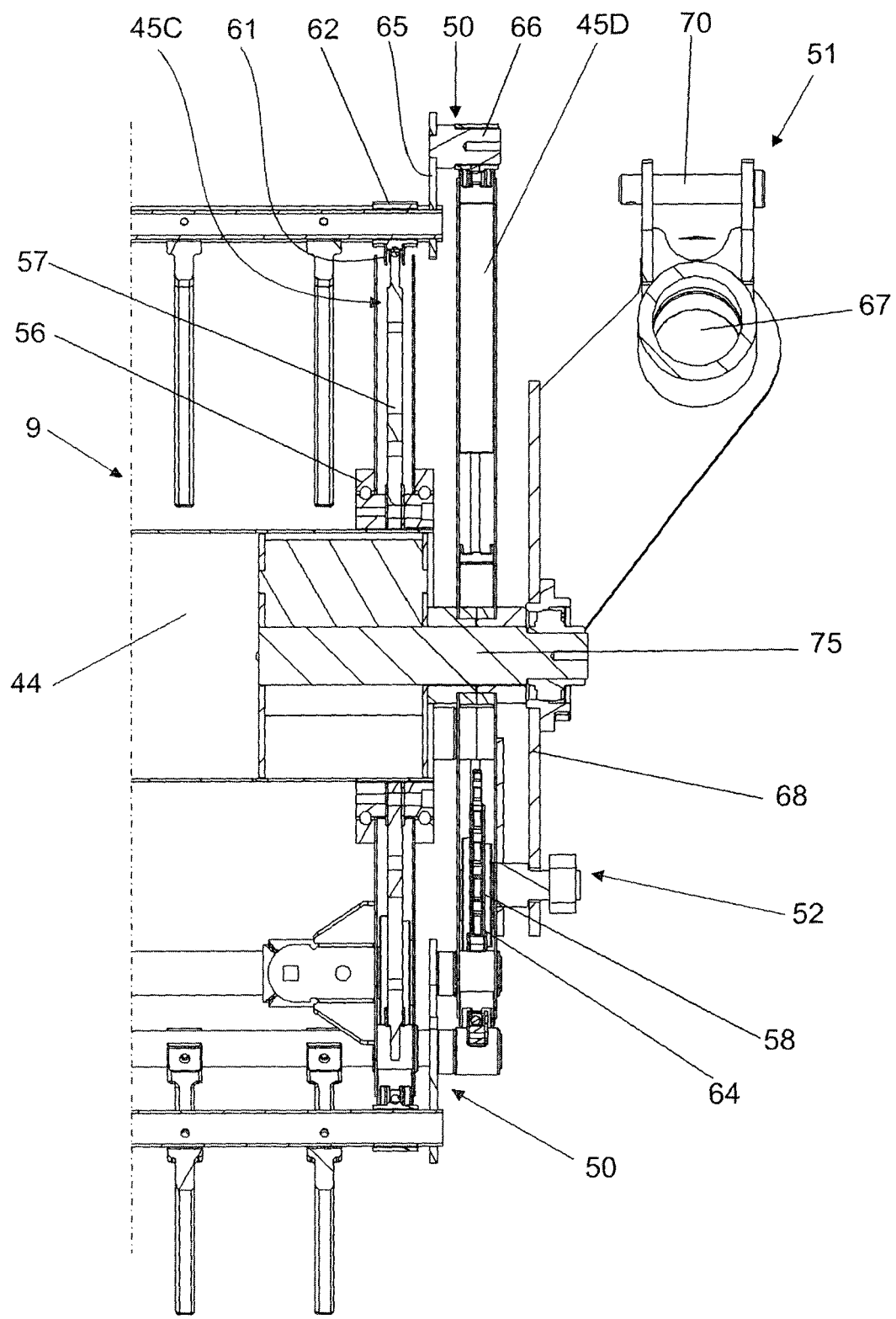
FIG. 25 is a magnified view of detail "C" indicated in FIG. 15.

We can tell by observing FIG. 21, that the driving of hydraulic engine (71) permits the rotation transmission by chain (74) and gears (72 and 73) to rotate the tubular axis (44) though its tip (75), which in turn moves the chains (60-64) of each box, dragging simultaneously along with it all the combs (9).

In reference to FIGS. 21 through 25, the supports (51) compose support bearings for the gathering and lifting roller (9), which in turn, as has been said, has its underside ordinarily flat, as it is desirable for this side to be adjustable according to the desired inclination, which increases the efficiency of the machine. For this, the supports (51) feature inclination regulating devices (52), set up in the lower bearing bush (68), where a curved slot (76) with a pin (77) and respective locknut (78) are present. This pin is welded in a perpendicular manner to a base (79), which in turn is fixed against the plate wall (54) of the gathering roller (9), and this ways, inside the limit established by the slot (76) radius, said gathering roller (9) is regulated according to the inclination desired.

Figure 26:
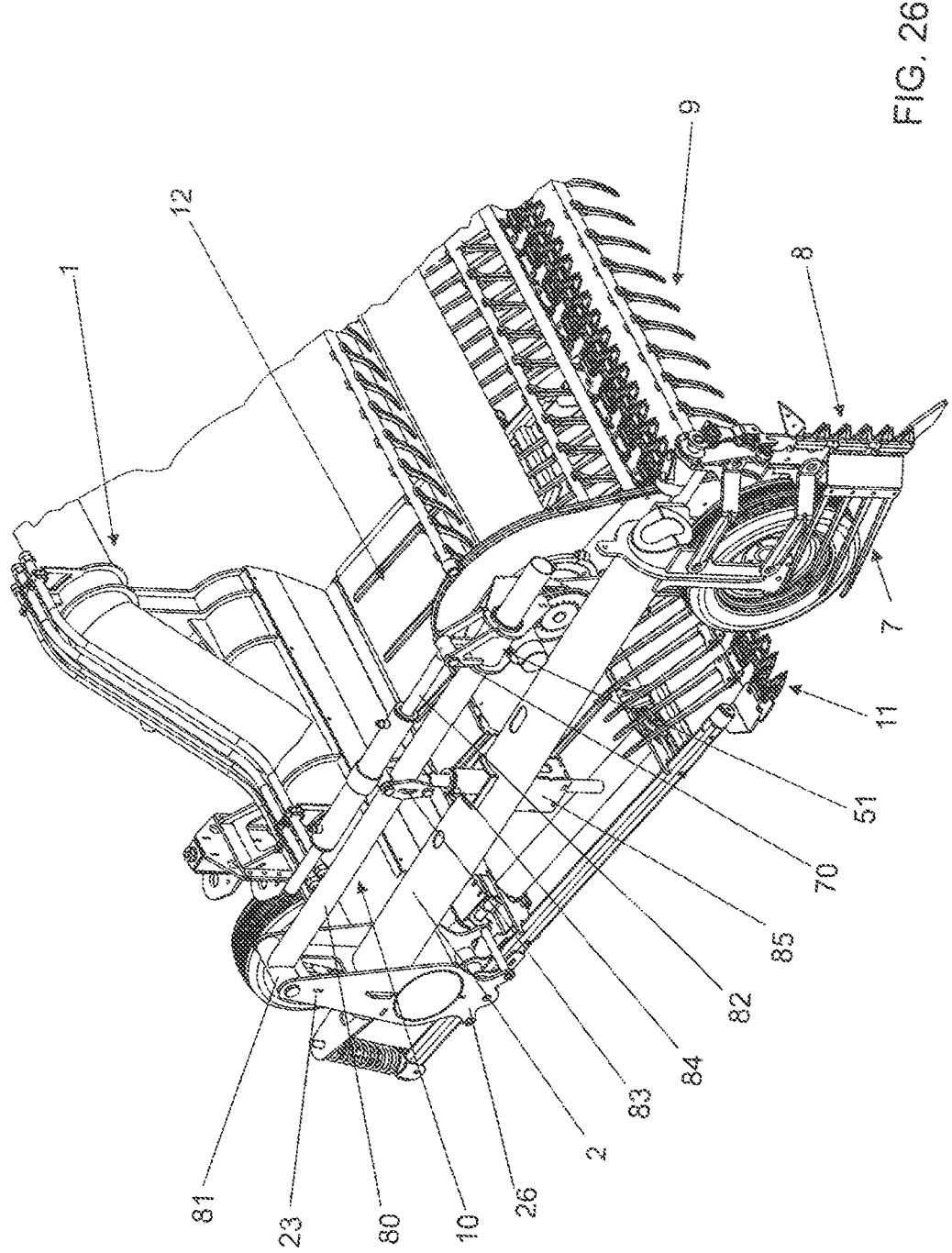
FIG. 26 shows a detail magnified in perspective, highlighting the right side of the implement to better show the supporting arm of the gathering and lifting roller.
Figure 27:
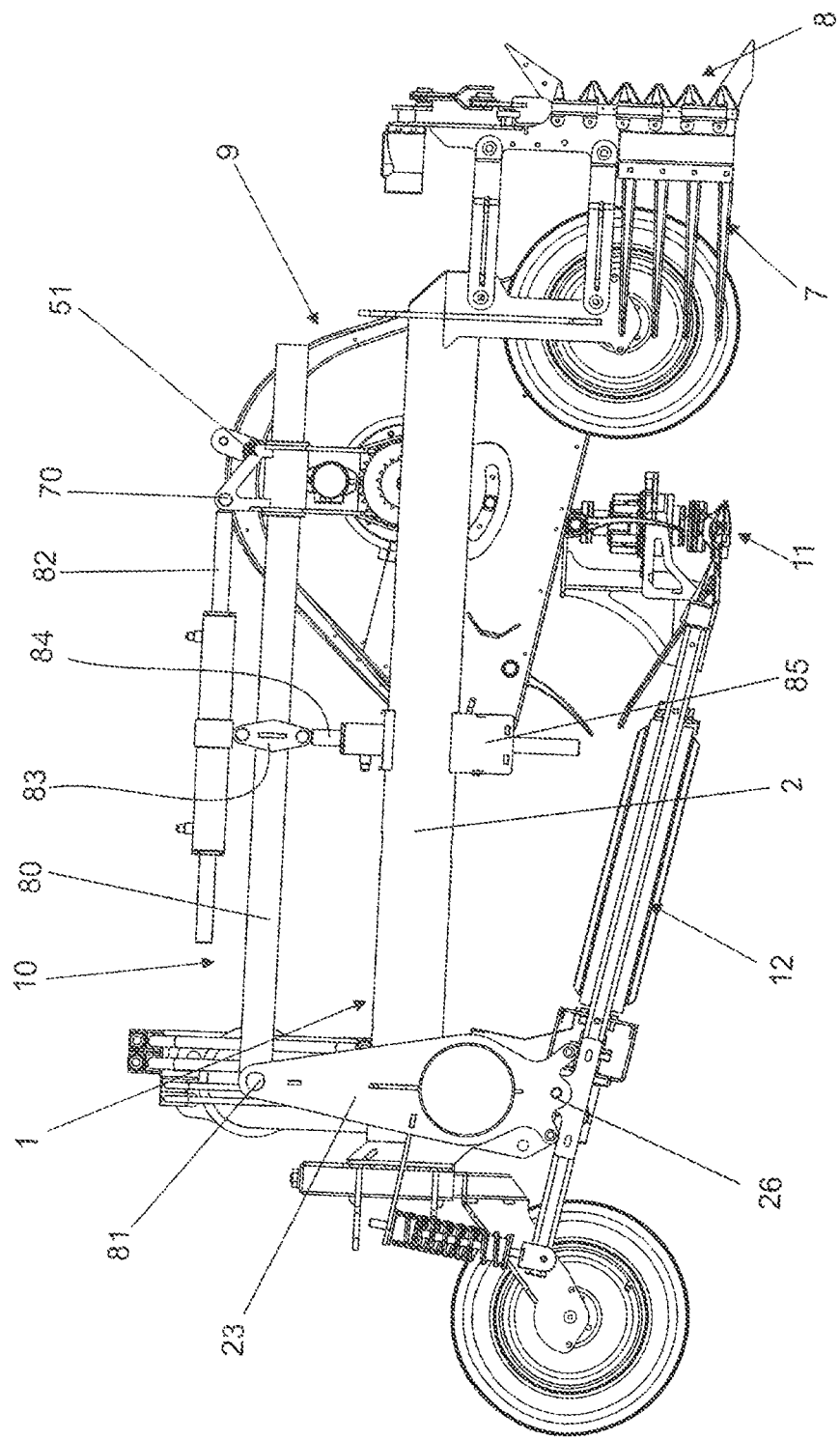
FIG. 27 is a right side view of the implement.
Figure 28:
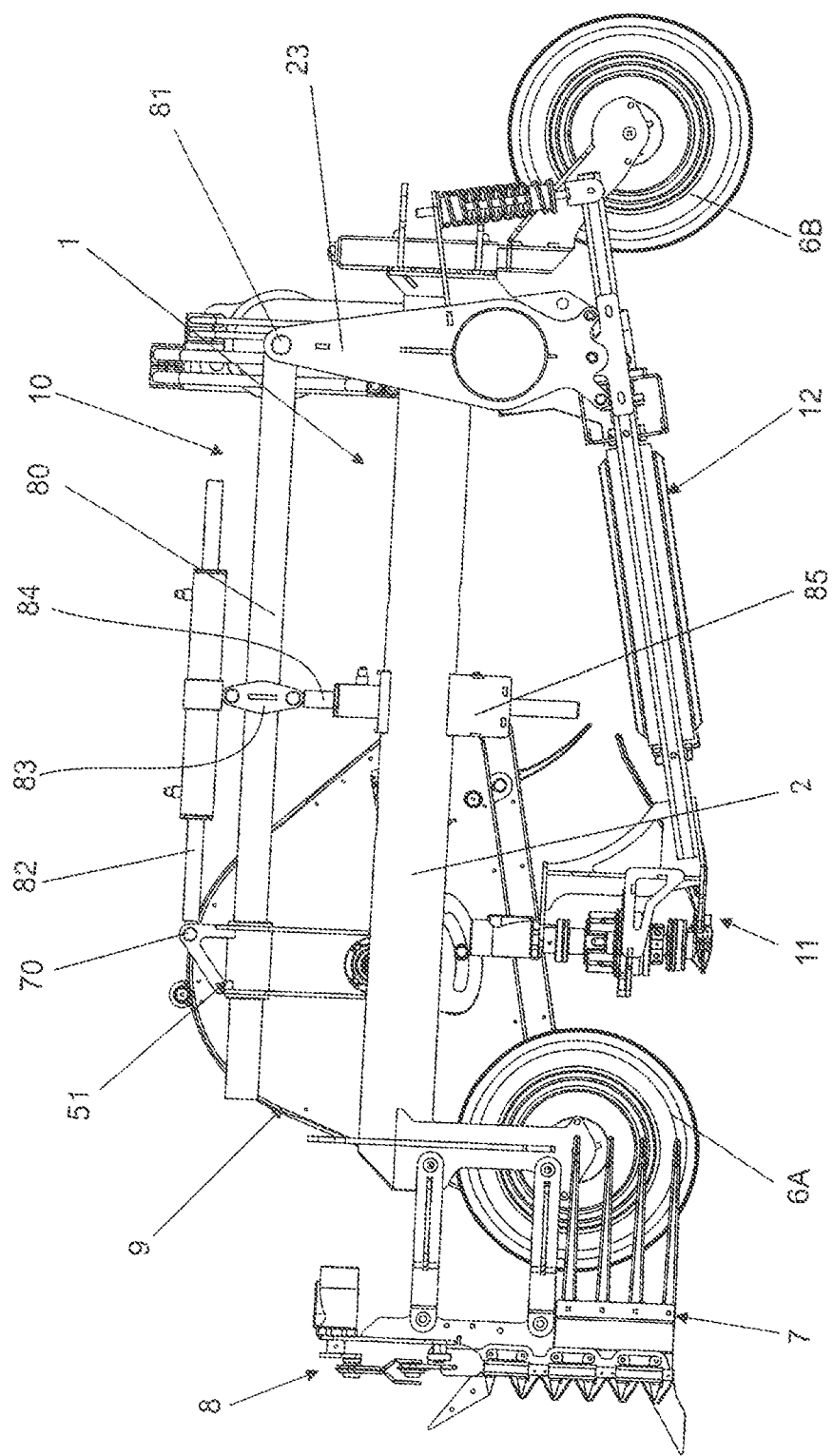
FIG. 28 shows a left side view of the implement.

FIGS. 26, 27 and 28 show in detail the swinging arms (10), one in each side, which extend along the side tubes (3). Arms with means for said gathering and lifting set to be adjusted horizontally and vertically to a desired position to be coherent with the surface of the soil and according to the type of plant being reaped and windrowed. This gathering and lifting set (9) is responsible for selecting a lane of plants corresponding to the width of the machine, moving it inward and upward, at the same time as the reaping. According to this, each swinging arm (10) is formed by a tube (80), whose rear "T" shaped end (81) is articulately coupled in the bearing (23) of the tubular structure (1), while by the opposite side its end slidingly pierces bearing of support 51, in whose trestle (70) is articulately coupled the end of a hydraulic cylinder (82), which in turn is also articulately fixed over tube (80) by a double bearing piece. This piece, which envelops tube (80), is moved vertically by another hydraulic tube (84), assembled on the inside of a box (85) fixed to the corresponding side tube (3). The combined triggering of both hydraulic tubes (82 and 84) allow the gathering and lifting roller (9) to be moved horizontally and vertically to adjust coherently with the surface of the soil and according to the type of plant being reaped and windrowed.

Figure 29:
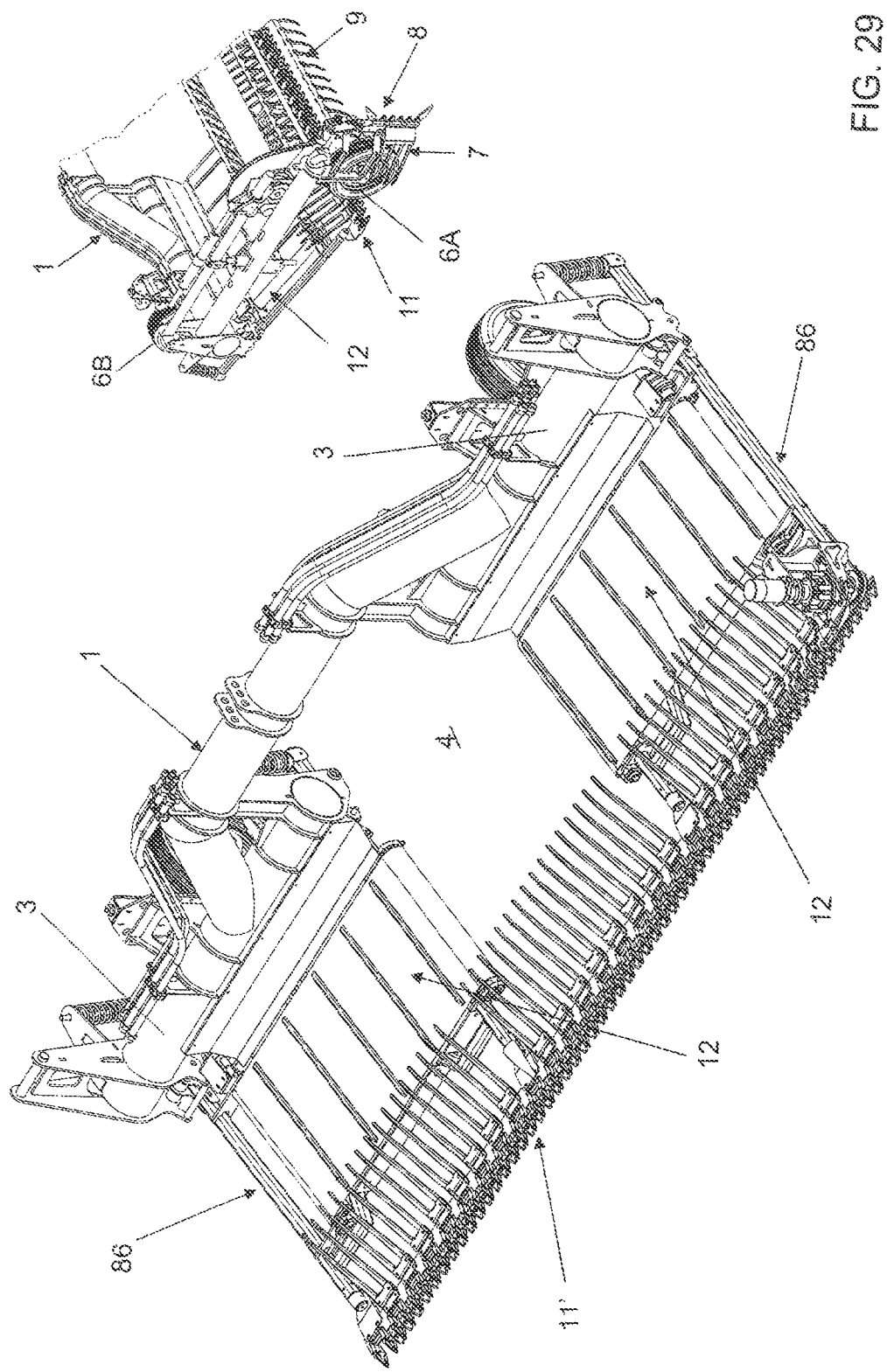
FIG. 29 represents two perspectives in an upper front angle of the implement partially assembled, highlighting the reaping and windrowing set.
Figure 30:
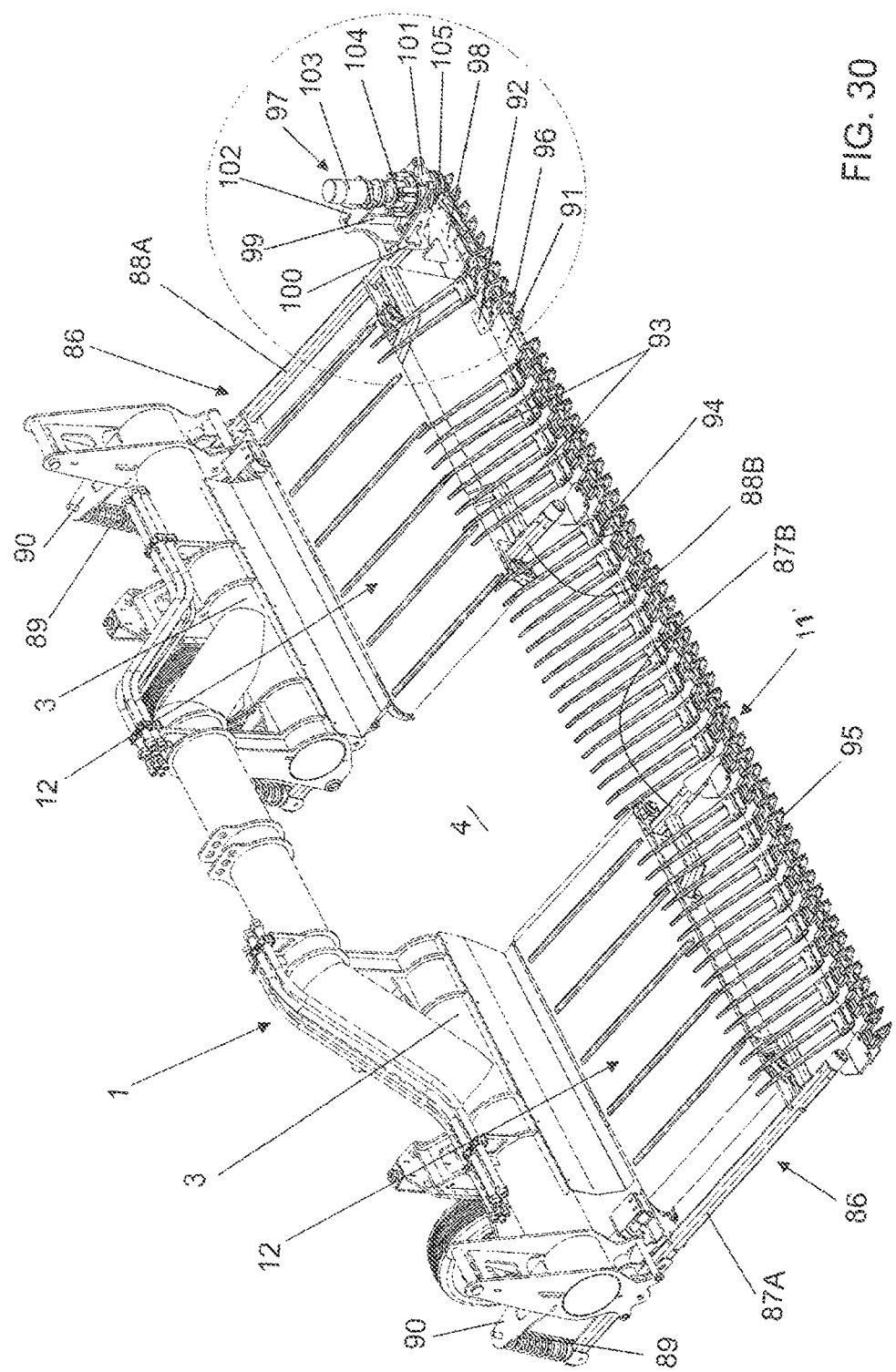
FIG. 30 shows another view similar to the previous figure, however, highlighting other details of the same set.
Figure 31:
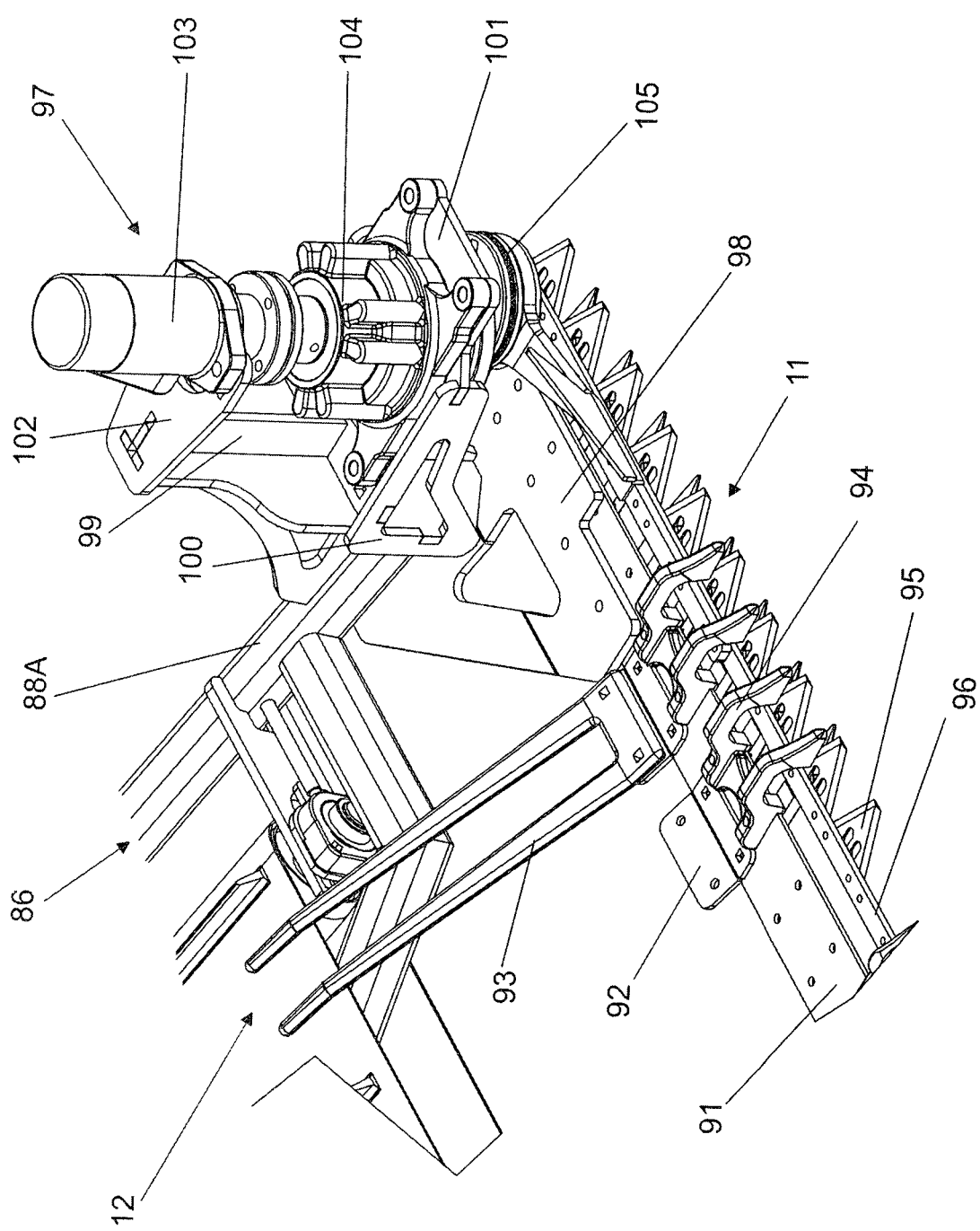
FIG. 31 illustrates an isometric view showing a magnified detail of the reaper and its components of activation.
Figure 32:
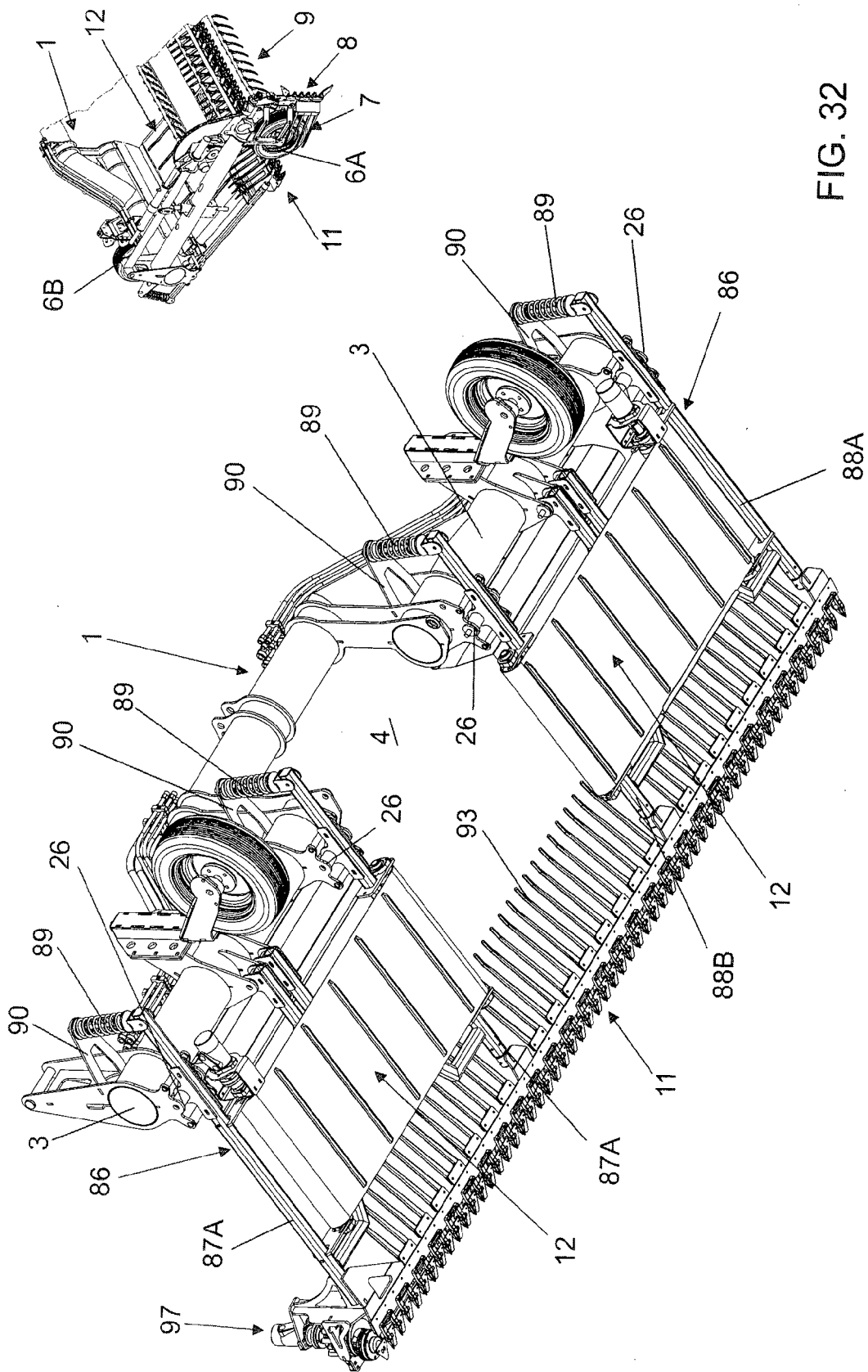
FIG. 32 shows two perspectives of the details of the reaper and windrowing conveyor belts: one from above, and the other from below, highlighting the reaper and windrowing conveyor belts.
Figure 33:
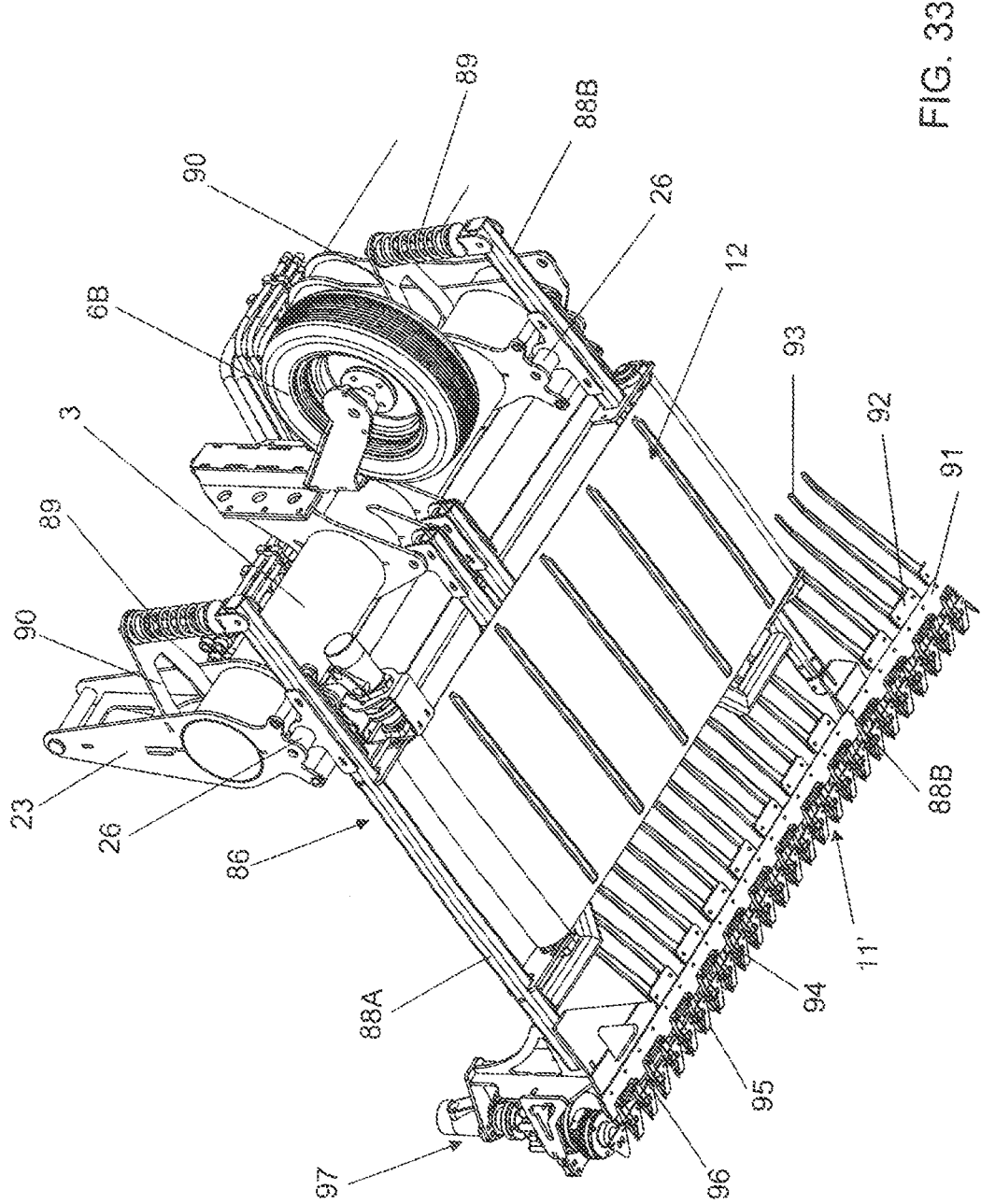

As has been mentioned before, the reaping set (11), as illustrated by FIG. 29, is assembled along the entire transversal extension of the machine right after the frontal wheels (6A) and the gathering and lifting set (9), forming a transversal cutting line kept over the soil. This reaping set is assembled on structure 1 in a spring manner that contributes to allow the cutting line to follow the level of the ground. With the forward movement of the set, the plants are cut at their base along all the transversal extension of the machine. At the same time, through the work carried out by the gathering and lifting set (9), the plants reaped are brought backwards, entering the phase of windrowing (12).

The reaper (11) can be seen in detail in FIGS. 30 to 33, and consists of an oscillatory structure (86) that is also shared by the windrowing set (12). This structure is composed by a set of square stringer tubes organized in two pairs: on the right 87A and 87B, and on the left 88A and 88B; One on each side of opening 4. All of them articulately bound beneath the structure (1) in a seesaw manner, more specifically beneath the tubes (3), and for this purpose are the bearings (26). At the rear end of these stringer tube pairs (87AB and 88AB), you will find vertically and articulately bound spiral spring structures (89), which in turn have their upper end supported by a lying down "V" shaped plate arm fixed and wholly part of support (26). On the other side, the front end of the stringer tube pairs (87AB and 88AB) sustain the actual reaper (11), which can be seen in detail in FIG. 3. It is composed by an elongated plate piece (91) rigidly fixed in all the frontal ends of the stringer tube pairs (87AB and 88AB), and on its rear edge are located a plurality of support platelets (92), each of these fixed to the base of a inclined orienting fork (93), which ends over the corresponding edge of the windrower set (12). Similarly, the rear edge of this elongated plate piece (91) contains a plurality of fixed equidistant scissors (94), in between which are positioned, in equal number and spacing, a set of cutting teeth (95). There are all fixed in a oscillatory plate piece (96), which in turn has one of its ends coupled to a driving set (97) better illustrated in FIG. 31. In this figure, it can be better seen that it is composed initially by a setsquare plate support (98) fixed between the plate piece (91) and the stringer tube (88A), and on top of it is a vertical "T" shaped elongation (99), two side plates (100), an intermediate base (101) and an upper base (102). To this last one is fixed a hydraulic engine (103), whose axis with elastic coupling faces down and is coupled to a gear box (104), below which the axis of it is coupled to a cam set (105) which, finally, is articulately attached to the oscillatory plate piece 96), moving it in a way that the cutting teeth (95) can be alternatively moved in between the fixed scissors (94). Consequently, with the forward movement of the machine, the plants enter in between the cutting parts of the reaper (11) and are cut at ground level, and then slide on the orienting forks (93) to be windrowed by set 12. The orienting forks (93) allow impurities such as clods, loose dirt, and stone to pass through them and fall back to the ground, consequently preventing such material to be rowed together with the plants and facilitating its sorting process later on.

Figure 34:
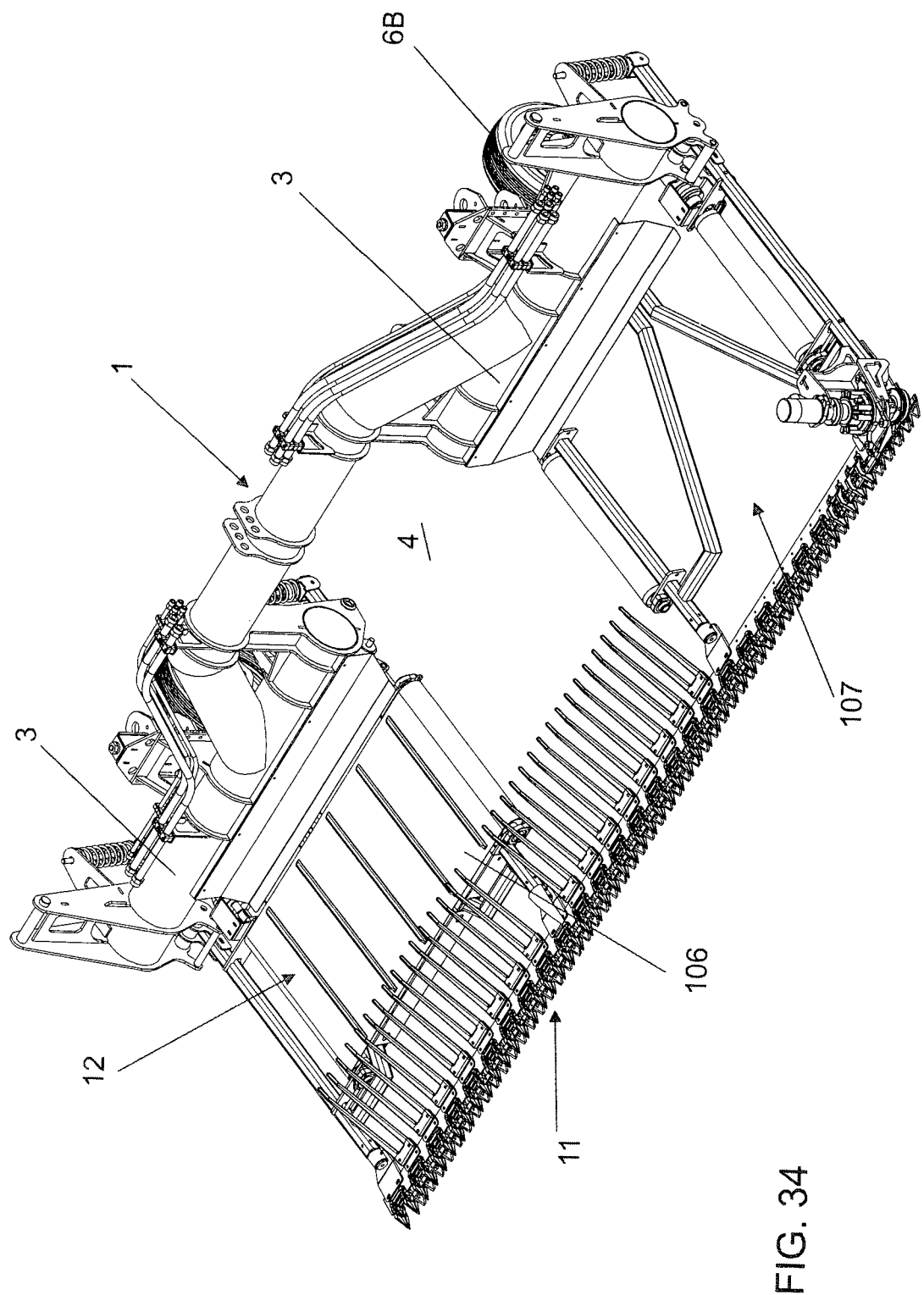
FIG. 34 reproduces a perspective in an upper angle highlighting the details of the windrowing conveyor belts.
Figure 35:
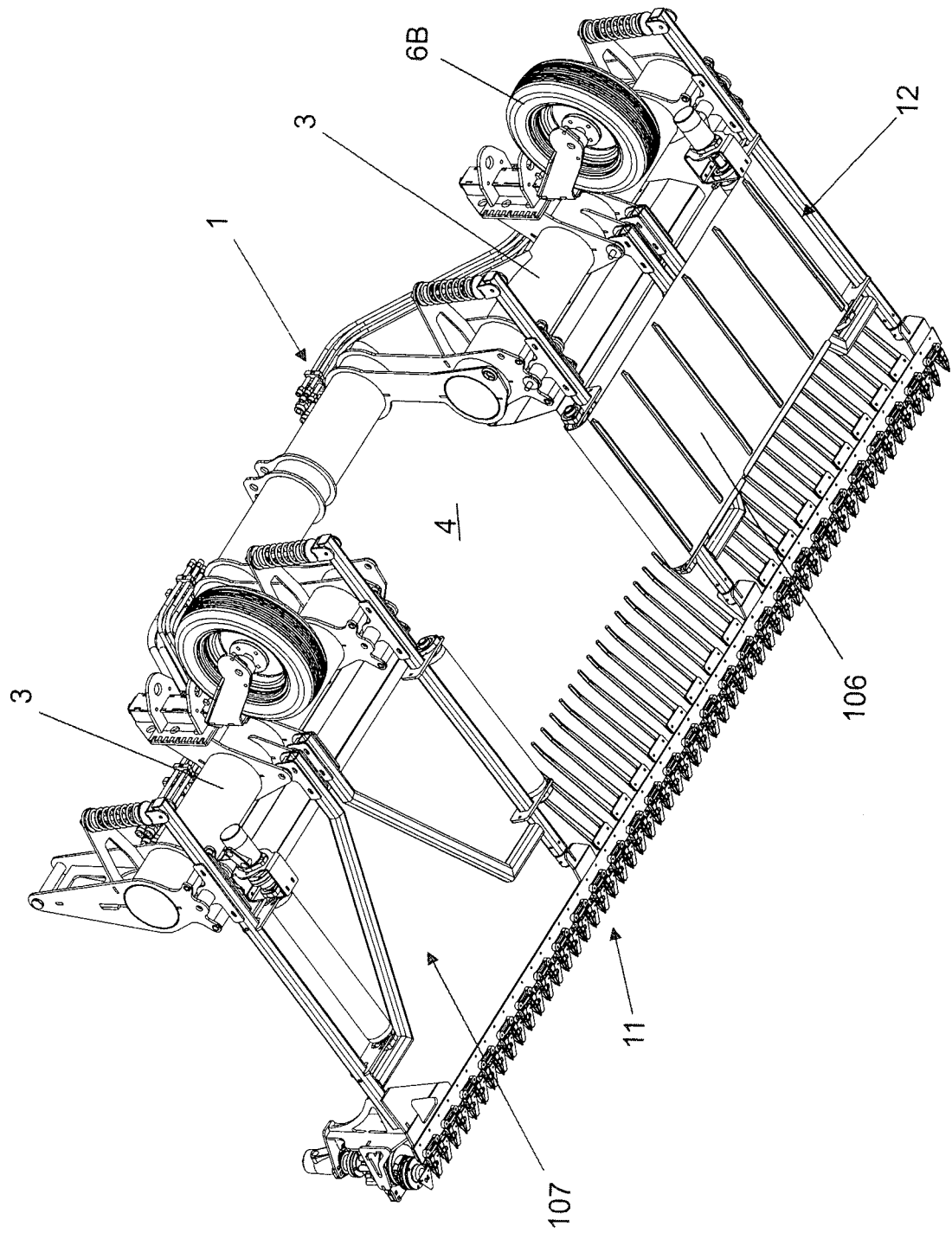
FIG. 35 is the same view as the one before, but from a low angle, showing other details of the conveyor belts.

The windrowing set (12) is illustrated in detail in FIGS. 34 and 35. In these, it can be seen that it is transversally positioned between the reaping set (11) and the tube segment (3) of the structure (1), which combines the opening (4) in a way that the reaped plants can pass through it continuously and form the windrows on the ground.

Figure 36:
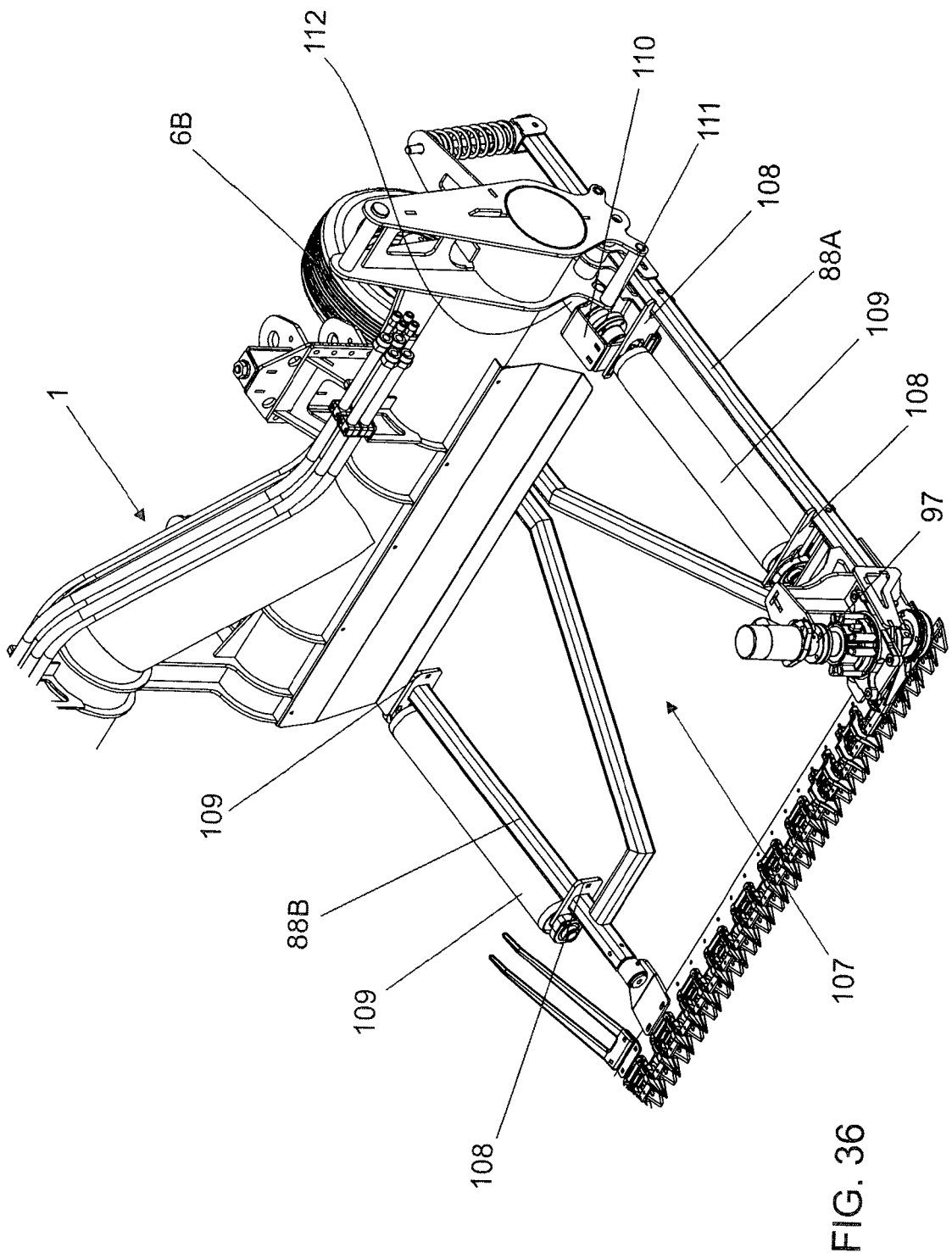
FIG. 36 shows a magnified detail of FIG. 34.
Figure 37:
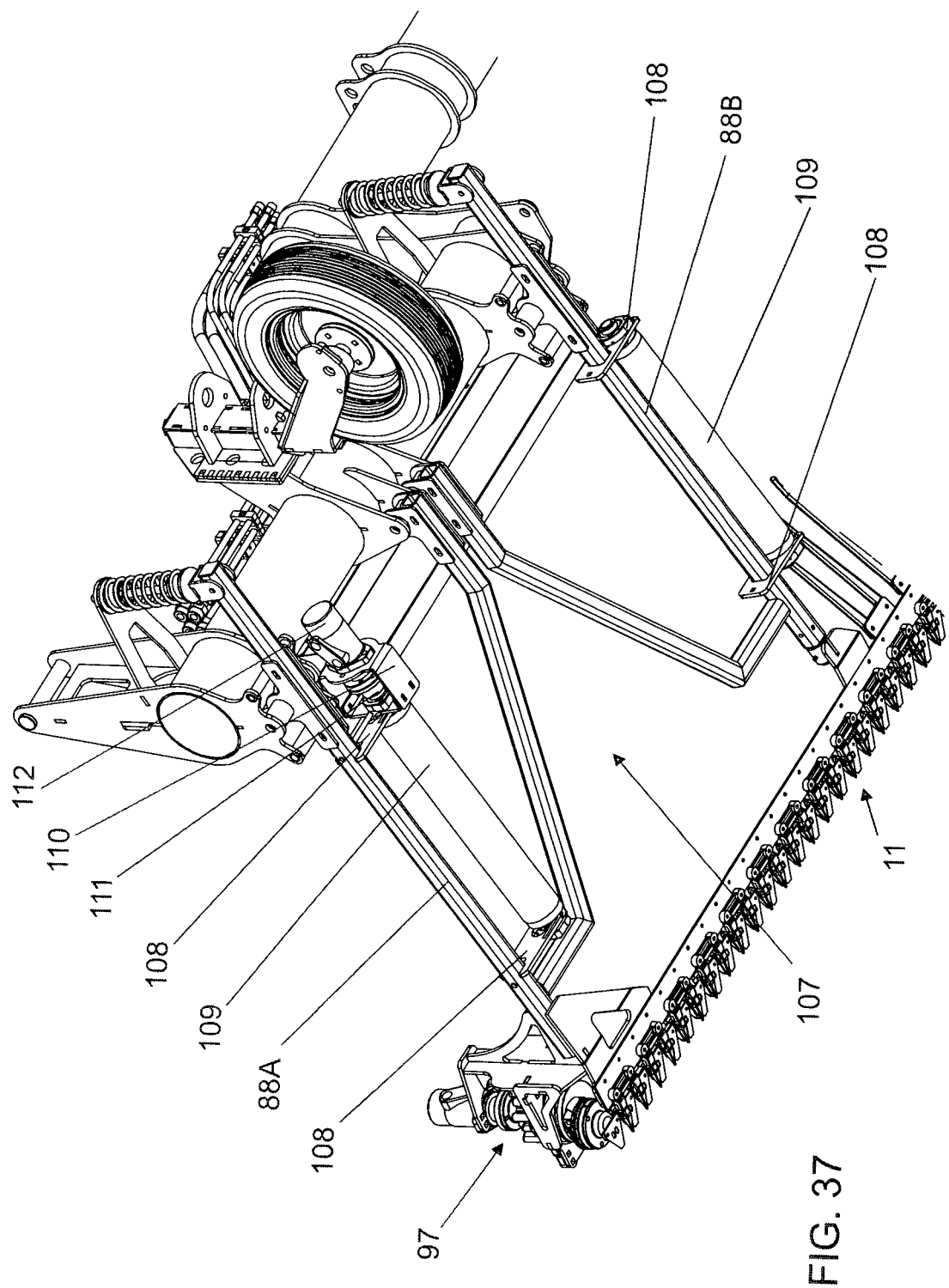
FIG. 37 illustrates a magnified detail of FIG. 35.

It is formed by two transversally aligned conveyor belts (106), each of these assembled in its complementary structure (107), better visualized in FIGS. 36 and 37. In these figures it can be seen that it is formed by "Y" shaped tubes, whose unified rear end is articulately fixed beneath structure (1), while its frontal ends are angularly folded outwards and welded to the corresponding stringer tube (87AB or 88AB). At this position of the stringer tubes, there is a pair of bearing sockets (108), each pair for a roller (109) positioned parallel to the corresponding pair of stringer tubes (87AB or 88AB)

and covered and enveloped by the belt (106). One of these rollers (109) is responsible for traction, and for this, besides having a complementary support (110), is coupled to a hydraulic engine (112) which spins in a direction contrary to its counterpart on the other side of the machine, so that both conveyor belts move toward the opening (4), tossing through it the reaped material which is windrowed on the ground.

Even if not completely illustrated, In reference to FIG. 1, it is of common understanding that the implement includes an adequate ordinary hydraulic tabulation with all the connections necessary for connecting it to the hydraulic pump of a conventional tractor and the functioning of the hydraulic engines of each set. For as has been described, the vertical cutting set (8), the gathering and lifting set (9) and its lifting and regulating system (10), the reaping set (11) and the windrowing set (12) are all activated by hydraulic engines and pistons which consequently require a hydraulic pump and a control station assembled in a conventional tractor.

It is comprehended that certain characteristic of assembling and dimensional combinations can vary considerably, but maintaining the same functional concept for each set. Consequently, the construction described here in detail as an example is clearly subject to constructive variations. These variations would still be mantained inside the scope of the inventive concept here revealed, including a gathering and lifting roller (9) with a set of combs that move through translation around a fixed structure, considerably increasing the efficiency of the set. As many modifications can be made in the set here described in accordance to the descriptive claims of the law, it is understood that the present details must be interpreted in a illustrative manner, and not a limiting one.

The invention claimed is:

1. An agriculture implement for reaping and windrowing, comprising:
    (a) a substantially U-shape tubular structure (1), comprising:
       (a1) two side tubes (2) parallel and aligned in a same plane; having each a proximal end and a distal end;
       (a2) two rear portions, comprising each two tubular axial segments (3); having a first end and a second end; the first end connected to each of the two side tubes at the proximal end;
       (a3) a trapezoid-shape structural interconnection element (5); connected to each of the two rear portions at the second end of the two rear portions, defining an opening (4) between the two rear portions providing an exit for a windrowed material, and
       (a4) frontal wheels (6A) and rear wheels (6B); the frontal wheels (6A) mounted on the distal ends of the tubes (2); and the rear wheels (6B) mounted at a center portion of each of the tubular segments (3);
    (b) two sets of openers (7), each integrated with a vertical cutter set (8), mounted at the distal ends of the side tubes (2), in front if each front wheel (6A);
    (c) first assembling support sets (23) having first upper bearings (27) and first lower bearings (25), a support V-shape plate (90) and spring structures (89) attached to the support V-shape plate; the support sets (23) mounted at the first end of each of the two tubular axial segments (3);
    (d) second assembling support sets (24) having second lower bearings (26), attached to trapezoid-shape structural interconnection element (5) and to the second end of each of the two tubular axial segments (3), connecting the trapezoid-shape structural interconnection element (5) to the second end of each of the two tubular axial segments (3);
    (e) two sets of oscillatory arms (10), placed over the side tubes (2), each set comprising a hydraulic cylinder (82) and a first tube (80), the first tube having a T-shape end (81) articulately coupled to the support sets (23) by the first upper bearings (27), and an opposite end slidingly coupled to a bearing support (51), the bearing support (51) articulately coupled to an end of the hydraulic cylinder (82) by a trestle (70); both the hydraulic cylinder (82) and the first tube (80) articulately coupled to a double bearing piece which envelopes the first tube (80), and is actuated vertically by a hydraulic tube (84), assembled inside of a box (85), the box fixed to each of the two corresponding side tube (2);
    (f) a gathering and lifting set (9) extending for the entire width between the frontal wheels (6A) having a first and a second ends attached to the set of oscillatory arms (10); the set oscillatory arms (10) constructed and arranged to enable the gathering and lifting set (9) to be moved vertically and horizontally according to a desired adjustment coherent with a surface of a ground and according to a type of plant being reaped and windrowed;
    (g) a reaping set (11) attached to the spring structures (89) and assembled along the entire width between the frontal wheels (6A), constructed and arranged to forming a transversal cutting line over the ground and according to a type of plant being reaped and windrowed, and
    (h) a windrowing set (12) positioned transversally between the reaping set (11) and the tube axial segment (3) of the tubular structure (1).

2. The agriculture implement of claim 1, wherein the frontal wheels (6A) are mounted on the distal ends of the side tubes (2) by plate forks (13) having circular fitting spaces for coupling to the distal end of the side tubes (2), and side plates (14) lodged inside axis of frontal wheels (6A); and the rear wheels (6B) are mounted at a center portion of the each tubular axial segments (3) by pressing plates (15), having a circular fitting opening for coupling to each of the two tubular axial segments (3), and having third lower bearings (16) and a vertical mirror (17), the mirror enabling for leveling a vertical mounting support of a counter plate (18), a pair of flaps (21), and a square tube equally vertical (19), the tube lodging a fork (20) of the rear wheels (6B).

3. The agriculture implement of claim 1, further comprising plate rings (22) attached at a central section of the trapezoid shaped tube (5), the plate rings constructed and arranged to coupling the implement to a front of a tractor.

4. The agriculture implement of claim 1, wherein the opener sets (7) further comprise a plurality of fixed plates (28), two equal Y-shape supports (29) on each edge, the supports (29) having a plurality of tips facing backwards surrounding the frontal wheel (6A), and attached to the wheels by side plates (14); and further comprising a pair of V-shape plates (30) having a plurality of ribs (31), also surrounding the front wheels (6A).

5. The agriculture implement of claim 1, wherein each cutting set (8) is assembled at a moving plate piece (36) along a frontal edge of the fixed plates (28) with a row of triangular cutting teeth (32), the edges extending forward, wherein un upper tooth (33), having an upward inclination and a lower tooth (34) having a downward inclination, are longer, both teeth constructed and arranged to funnel harvested plants toward the row of the triangular cutting teeth (32) and towards a set of moving teeth (35); the moving plate piece (36) mounted on a sliding manner inside strainers (37A) with fixed teeth (37B), and fixed on the plate piece (28), wherein the moving teeth (35) stay in between the fixed teeth (37B) and the row of triangular cutting teeth (32), actuating as a scissor movement, and wherein the moving plate piece (36) is fixed to the fixed plates (28), and has an upper end guided between first bearings (38) and is orthogonally connected through a prolonging (39), and by a means of articulation (40), and is connected to a cam set (41) and a respective triggering set by a first hydraulic engine (42) assembled on a support (43), serving as a base for the two bearings (38).

6. The agriculture implement of claim 1, wherein the gathering and lifting set (9) further comprises:

a rotating central tubular axis (44), having a first transmission and synchronism box (45A) attached at a central section of the central tubular axis (44), a second and third transmission and synchronism box (45B) and (45C) having an inward face and an outward face, at opposite ends, and a fourth transmission and synchronism box (45D), having an inward face and an outward face, adjacent located in parallel with the third transmission and synchronism box (45C), the transmission and synchronism boxes having identical dimensions, vertically aligned to a same plane and having a triangular shape with rounded corners, with a vertex pointing up and a side pointing down;

at least two stabilizing bars (46) including respective supports (47) located between the first and the second transmission and synchronism box (45A and 45b) and between the second and third transmission and synchronism box (45B and 45C);

a dragging device (48) located on an outline edge of the first, second, third and fourth transmission and synchronism boxes (45A, 45B, 45C and 45D);

a plurality of combs (49) equally distant attached to the dragging device (48) on a vertical position in parallel to each other, constructed and arranged to travel simultaneously on a complete and continuous movement along with a movement of the first, second and third transmission and synchronism boxes (45A, 45B and 45C);

a complementary device (50) assembled on the outline edge of the fourth transmission and synchronism box (45D), constructed and arranged to maintain each comb in a vertical position;

a device for regulating the inclination (52) of the gathering and lifting roller (9) attached to the outward face of the second transmission and synchronism box (45B), wherein, the bearing support (51) for the central tubular axis (44) is attached to the outward face of the fourth transmission and synchronism box (45D), and comprises a second upper bearing (67) and a fourth lower bearing (68), orthogonally positioned, the second upper bearing (67) having a U-shape liner plate piece (69) welded in and coupled to the trestle (70), forming a fitting for the sets of oscillatory arms (10), the gathering and lifting roller (9) sliding forward and backwards up to an adequate position for functioning, and wherein, the fourth lower bearing (68) forming a point of articulated anchorage for one of the ends of the central tubular axis (44), through a triggering set (53).

7. The agriculture implement of claim 6, wherein the first, second and third transmission and synchronism boxes (45A, 45B and 45C) further comprise:

first two plate walls (54), having an identical triangular shape with rounded corners and identical dimensions, the two first plate walls (54) mounted juxtaposed to each other, spaced apart by segments of U-shape profiles (55) facing outward distributed along each of the three sides of the triangular shape;

a central bearing (56) providing rotating support for the rotating central tubular axis (44);

a first gear (57) of a diameter sufficient to coincide with the radius of the rounded upper corner of each of the two first plate walls (54), the gear mounted on the central bearing (56), and a second and a third gears (58) and (59), smaller in diameter to first gear (57), with bearings between the two first plate walls (54), each coinciding with the lower rounded corners of each of the two plate walls (54), wherein first, second and third gears (57, 58 and 59) drive a chain (60), the chain running through an inside of the U-shape profiles (55) and linked to a corresponding support (61) and respective bushings (62), wherein the combs (49) are rotationally supported and actuated by the first chain (60).

8. The agriculture implement of claim 6, wherein the forth transmission box (45D) is constructed and arranged at a predetermined position above the third transmission and synchronism box (45C) and further comprises:

second two plate walls (54'), having an identical triangular shape with rounded corners and identical dimensions, the second two plate walls (54') mounted juxtaposed to each other, spaced apart by segments of second U-shape profiles (55') facing outward distributed along each of the three sides of the triangular shape;

a forth and a fifth gears (58') and (59'), each coinciding with the lower rounded corners of each of the second two plate walls (54');

a substantially semicircular U-shape guide (63) containing second chain (64), in which is coupled to the complementary device (50), the complementary device further comprising a vertical piece (65), articulately attached to a support (66) and fixed to the second chain (64) at a first end, and rigidly fixed to one of the sides of the corresponding comb (49) at a second end.

9. The agriculture implement of claim 6, wherein the triggering set (53) is formed by a second hydraulic engine (71), a transmission with sixth and seventh gears (72 and 73), a chain (74) and an axis tip (75), wherein the axis tip (75) is connected to the corresponding end of the rotating central tubular axis (44), and to the respective 'first and second plate walls (54 and 54'), and wherein the fourth lower bearing (68) receives the sixth gear (72) which is connected to seventh gear (73), the seventh gear (73), fixed to the axis of the second hydraulic engine (71), having a flange fixed to the bearing support (51).

10. The agriculture implement of claim 6, wherein the device for regulating the inclination (52) is located on the fourth lower bearing (68), and comprises a curved slot (76) with a pin (77) and a respective locknut (78), wherein the pin (77) is welded on a perpendicular manner to a base (79), the base fixed against the respective plate walls (54 and 54') of the gathering roller (9), and wherein, inside the limit established by the curved slot (76) radius, the gathering roller (9) is regulated according to the desired inclination.

11. The agriculture implement of claim 1, wherein the reaping set (11) further comprises:

an oscillatory structure (86), composed by a left pair of square stringer tubes (88A and 88B) and a right pair of square stringer tubes (87A and 87B), on each side of the opening (4); wherein the stringer tubes are attached to the spring structures (89) at a rear end and are articulately bound under the two tubular axial segments (3) in a seesaw manner, through second lower bearings (26)

a reaper (11'), comprising:
- an elongated plate piece (91) rigidly attached to a front end of the stringer tubes (87A, 87B, 88A and 88B), having a plurality of support platelets (92), each to a base of an inclined oriented fork (93), which ends at a corresponding edge of the windrower set (12) and having a plurality of fixed equidistant scissors (94) including a set of cutting teeth (95) in between the equidistant scissors (94);
- an oscillatory plate piece (96), coupled to a driving set (97) at one end comprising a setsquare plate support (98) fixed between the plate piece (91) and the stringer tube (88A), and having a vertical T-shape elongation (99), two side plates (100), an intermediate base (101) and an upper base (102) placed on top of the setsquare plate support (98), and
- a third hydraulic engine (103), coupled to a gear box (104) and having an axis coupled to a cam set (105), the cam set articulately attached to the oscillatory plate piece (96).

12. The agriculture implement of claim 1, wherein the windrowing set (12) further comprises:
- two transversally aligned conveyor belts (106), each conveyor belt assembled on a complementary structure (107) formed by Y-shape tubes, the tubes articulately fixed under the tubular structure (1) at a rear end; and angularly folded outwards and welded to the corresponding stringer tubes (87A, 87B, 88A and 88B) at a front end, and
- a pair of bearing sockets (108), each containing a pair of rollers (109) positioned parallel to the corresponding pair of stringer tubes (87A, 87B, 88A and 88B), the roller enveloped by the belt (106),
- wherein, one of the rollers (109) has a complementary support (110) and is coupled to a fourth hydraulic engine (112), providing traction, which spins in a direction contrary to a counterpart rollers (109) on an opposite side, so that both conveyor belts move towards the opening (4).

\* \* \* \* \*